Jan. 11, 1966  A. T. FELLOWS  3,228,850
CHEMICAL CONVERSION IN PRESENCE OF NUCLEAR FISSION FRAGMENTS
Filed April 22, 1960  2 Sheets-Sheet 1

INVENTOR.
Albert T. Fellows
BY
John A. Crowley, Jr.
Attorney

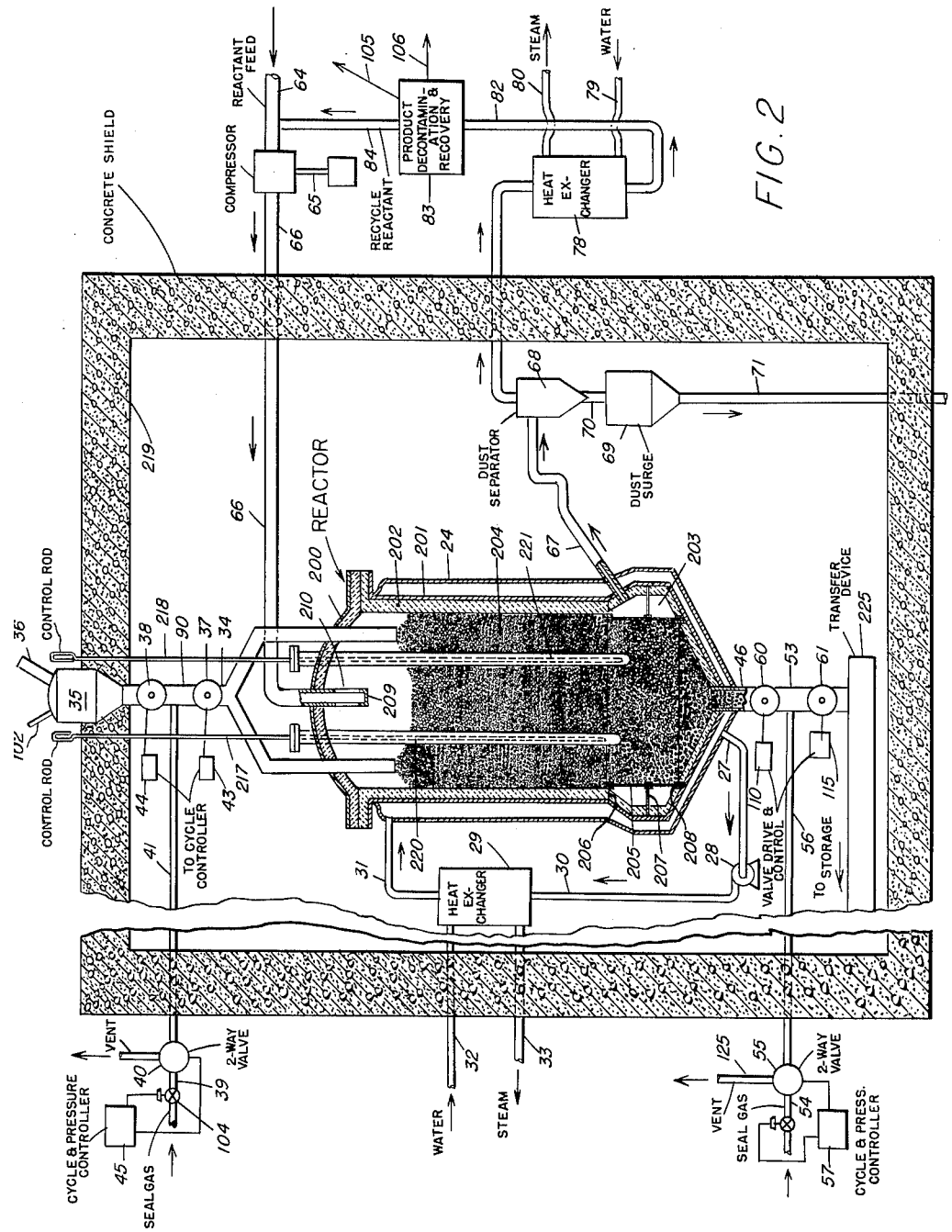

United States Patent Office 3,228,850
Patented Jan. 11, 1966

3,228,850
CHEMICAL CONVERSION IN PRESENCE OF
NUCLEAR FISSION FRAGMENTS
Albert T. Fellows, Levittown, Pa., assignor to Socony
Mobil Oil Company, Inc., a corporation of New York
Filed Apr. 22, 1960, Ser. No. 24,126
15 Claims. (Cl. 176—39)

This application is a continuation-in-part of Serial Number 849,471, filed in the United States Patent Office on October 29, 1959, now abandoned.

This invention is concerned with an improved method and system for utilizing kinetic energy of nuclear fission products for conduct of chemical reactions and transformations which can be made to progress only upon supply of substantial amounts of energy. The invention is also concerned with certain contact material mass members suitable for use in such improved method and system.

*Prior art*

It is known that many chemical reactions may be caused to occur by subjection of the reactants, either in the presence or absence of porous or catalytic solid materials, to irradiation by alpha particles, neutrons, beta rays or electromagnetic gamma radiations emitted by radioactive materials and as a result of nuclear fission reactions.

United States Patent No. 2,905,607, discloses conversion of distillate hydrocarbons in the presence of particles of cracking catalysts such as alumina and silica-alumina under exposure to a neutron flux to gasoline of high isoparaffin content and high quality diesel fuels. United States Patent No. 2,905,606, discloses exposure of hydrocarbons boiling up to 1,150° F. in the presence of added hydrogen and a number of disclosed hydrogenation catalysts such as platinum on alumina to a neutron flux at a temperature in the range of 50 to 700° F. to effect both hydrogenation and conversion to lower boiling products. Coekelbergs et al. have discussed methods of the above type utilizing the radiant beta and gamma energy stored in the wastes of nuclear industry ("Some Future Aspects of Radiochemistry," Belgische Chemische Industrie 22, No. 2, 153–64 (1957)).

It is known that the fission of fissionable materials, for example, uranium-235 ($U^{235}$), not only gives rise to energy in the form of certain forms of radiant energy and neutrons, but also to particles of large mass, possessed of energy in very considerable quantity. The energy in these particles of large mass is of the order of 80% of the total energy delivered by the fission of $U^{235}$. The possible utility of such energy may be exemplified, in a manner, by the following comparison. The energy necessary to break a hydrogen to carbon bond in methane is of the order of 4 electron volts. The energy, per fission, available in the total of the high mass fractions from the fission of a $U^{235}$ atom is of the order of 162 million electron volts.

It is known that these energies may be utilized for such purposes. Coekelbergs et al. (supra) discuss both the utilization of the energy of radiant beta and gamma energy from wastes of the nuclear industry and also the utilization of the much greater recoil energy, which is communicated to fission fragments for the conduct of chemical reactions. A number of large G value exothermic and small G value endothermic radiochemical reactions are listed. These includes oxidation of organic and inorganic compounds, for example, oxidation of benzene to phenol; polymerization and halogenation of hydrocarbons, for example, polymerization of ethylene; fixation of nitrogen; synthesis of ammonia; and rupture and tranformation of organic and inorganic molecules, for example, transformation of methane to hydrogen and $C_2$ hydrocarbons, including acetylene, of acetylene to benzene and of water to hydrogen and oxygen.

Similarly, Harteck and Dondes have described experiments in which chemical reactants were placed in sealed vessels containing powdered, enriched $U^{235}$ and subjected in a nuclear reactor to thermal neutron flux of $10^{12}$ neutrons per square centimeter per second, whereby fission fragment ionization, as well as other usual ionizing radiations, was utilized to cause chemical conversion of gaseous reactants to different chemical products. The conversions of $CO_2$ to $CO$ and $O_2$ and of $N_2$ and $O_2$ to $NO_2$ and $NO$ were particularly studied. It was shown, for example, that fission energy could produce up to $10.2 \times 10^6$ moles of $NO_2$ per mole of $U^{235}$ at 175 to 225° C. ("Producing Chemicals With Reactor Radiations," Harteck and Dondes, Nucleonics, volume 14, No. 7, 22–25, July 1956.) These workers have also effected conversion of methane to hydrogen and ethane and of liquid and gaseous ammonia to nitrogen, hydrogen and small amounts of hydrazine by subjecting, respectively, methane and ammonia sealed in silica vessels with one micron diameter glass fibers containing uranium oxide to a flux of neutrons at 10° C. and 10 atmospheres. In these experiments, part of the kinetic energy of the fission fragments which were emitted from the small diameter glass fibers was absorbed by the reactant phase and utilized for effecting the chemical conversion of the reactants present. ("Glass Fibers, A New Form for Reactor Fuels," Harteck and Dondes, Nucleonics, volume 15, No. 8, 94 et seq., August 1957.)

In British Patent No. 770,594, published March 20, 1957, it is shown that a large number of chemical reactions may be initiated by causing fissionable atomic nuclei, which have been dispersed in solution or in very finely divided form throughout the reactants, to fission. Fissionable material, is mixed with organic reactants in the liquid phase and caused to fission, whereby the effects of the fissioning nuclei are used to produce organic molecular fragments, which then combine to produce desired compounds. It is shown that a wide variety of organic reactions can be effected in this manner. One such type of reaction is the reaction of a simple compound with itself to produce a dimer of the molecular fragment formed from carbon-hydrogen bond rupture, for example, the conversion of methanol to ethylene glycol and formaldehyde, conversion of ethanol to mixed butanediols, conversion of acetic acid to succinic acid and of isobutane to isooctane. Also, reactions between dissimilar organic compounds are described.

Those of the above systems which involve utilization of kinetic energy from heavy fission fragments depend upon direct transfer of kinetic energy from the fission fragments to the fluid reactant. In these systems, the fissionable material is either dissolved in the reactant liquid or very small grains of fissionable material or of non-porous carrier material containing fissionable material are mixed with the reactants. On the other hand, Coekelbergs et al., in a paper entitled "Investigation of a Nuclear Fuel Making It Possible to Use the Kinetic Energy of Fission Products for Chemical Synthesis," presented at the Second International Conference on the Peaceful Uses of Atomic Energy and presented in volume 29, pages 424–32 of the Proceedings thereof, have incorporated naturally occurring uranium in finely divided, microporous solids and examined the reactions of $N_2O$ in the presence of such materials when subjected to the neutron flux obtainable in a nuclear reactor. Natural uranium oxide was dispersed in finely divided, large surface area, microporous alumina, active carbon and silica gel base supports, the exact shape and particle size of which are not specifically disclosed. It is shown that, due to the transfer of part of the fission fragment energy from the microporous solids to the fluid reactant phase, the velocity and amount of conversion of $N_2O$ to $N_2$, $O_2$ and $NO_2$ are greatly increased over the velocity and amount of conversion observed for a given radiation intensity in the absence of the microporous supports. In other words, the presence of the microporous material in which the fissionable material is dispersed greatly increases the G for the chemical conversion, where G expresses the number of molecules of fluid reactant product formed or reactant feed which disappears in the chemical reaction for a dissipation of 100 e.v. of fission fragment energy. In effect, a substantial amount (up to about 20% in some cases) of fission fragment energy absorbed by the carrier is transferred therefrom to the fluid reactant phase where it may be, at least in part, utilized and transformed into chemical energy.

The contact materials disclosed in the last-mentioned reference are characterized by very low contents of $U^{235}$, being of the order of less than one-quarter of one percent by weight. Also, the systems disclosed in references hereinabove mentioned are such as to permit substantial quantities of heavy, solid fission fragments to escape from the carrier material and to enter the fluid reactant stream.

Problems

As a result of the fission of an atom of fissionable material such as uranium, for example, some energy is released in the beta decay, radioactive gamma decay, fission neutrons, neutrinos and prompt fission gamma radiation. However, about 80% of the total energy released is in the form of kinetic energy of fragments of larger mass. There are a large number of these fragments varying in mass number from 72, an isotope of zinc, to 158, an isotope of europium. However, most of the fragments fall into a light group with mass numbers from about 85 to 104 and a heavy group with mass numbers from 130 to 149. Among the nuclides which have been noted in the fission products from $U^{235}$, for example, are xenon-135, cesium-137, strontium-89, barium-140, yttrium-91, cerium-141, zirconium-95, krypton-85, molybdenum-99 and iodine-131. For a given mass number, fragments have been observed with atomic numbers varying over a range of three or more, for example, tellurium-133, a solid at normal conditions, iodine-133, solid or vapor, depending upon temperature, and xenon-133, a gas at normal conditions, all have been observed among the fission products.

Many of the fragments formed by the fission reaction are radioactive and some of the normally solid fragments formed have relatively long half lives. Escape of such materials from the carrier particles results in contamination of the fluid reaction products with radioactive material and complicates product recovery. It is important to prevent such escape for the above reason and also in order to insure maximum utilization of the fission fragment kinetic energy for conducting the chemical conversion or transformation of fluid reactants present.

Related application

In copending application Serial Number 24,124, filed in the United States Patent Office on April 22, 1960, there is claimed a method for utilizing the kinettic energy of heavy fission fragments for conduct of chemical conversions of fluid reactants, wherein the fluid reactants are brought into contact with a mass of porous, particle form contact material containing dispersed fissionable material in sufficient concentration to render the mass capable, in the presence of suitably controlled and moderated neutron flux, of effecting a neutron-multiplying fission reaction. Chemical conversion of the fluid reactant is effected with concomitant transformation of part of the kinetic energy of the normally solid fission fragments to chemical energy. The contact material particles containing dispersed fissionable material are shaped and sized in such a manner as to prevent substantial initial escape from the particles of normally solid fission fragments.

Area of present invention

The present invention is concerned with certain improvements and modifications in the method covered by my copending application and particularly with an improved chemo-nuclear process and system in which substantial escape of normally solid fission fragments or loss of grains of fissionable material from the contact material mass is effectively prevented.

Objects

A major object of this invention is the provision of an improved method and apparatus which may be applied to many chemical reactions of commercial importance for utilizing the unusually high recoil energy of nuclear fission fragments for conduct of chemical reactions and transformations in the presence of porous, solid contact materials, particularly microporous, solid particles.

A specific object of this invention is the provision of a method for utilizing the kinetic energy of nuclear fisison fragments to bring about the conversion of fluid chemical reactants to fluid products of different composition, while avoiding excessive contamination of the fluid reactant product with normally solid fission product fragments and while preventing entrainment of particles containing fissionable material from the conversion zone.

Another object is the provision of a method for utilizing the kinetic energy of nuclear fission fragments for conducting chemical conversion of fluid reactants, which method permits an economically practical efficiency of neutron utilization for promoting nuclear fission and an improved efficiency of conversion of fission energy to chemical energy, while avoiding excessive contamination of fluid reaction products with normally solid radioactive fission fragments, and which method also permits control of the conversion temperature and recovery of unused fission energy as power.

Another object is the provision of an improved construction member for use in chemo-nuclear reactors.

These and other objects of this invention will become more readily apparent from the following description thereof.

Summary of invention

This invention involves a method for utilizing the kinetic energy of the fission fragments for the conduct of those chemical conversions or transformations of fluid reactants to fluid products of different composition which require supply of substantial amounts of energy. In accordance with this method, the fluid reactant feed material is contacted in a confined zone with a mass of contact material made up of one or more bodies comprising an inner portion containing fissionable material and a porous outer shell portion which is substantially free of fissionable material. The shell portion is of sufficient thickness to substantially prevent initial escape of normally solid fission fragments therethrough to the exterior surface thereof and has porosity characteristics which are adapted to permit escape of gaseous fission products and to permit fluid reactants to enter and escape from the pores in the shell portion. A neutron flux is maintained in the mass and is suitably controlled to cause fission of the fissionable material in the inner portion of the body or bodies at a rate sufficient at least to supply the energy required for effecting the chemical conversion of the fluid reactant feed to desired products. The fluid products resulting from the chemical conversion escape from the contact material, leaving behind the normally solid fission fragments, and are withdrawn from the conversion zone.

In preferred forms of this invention, the contact material mass is made up of discrete solid particles having nominal diameters within the range of about 100 microns up to about one inch. Each particle is comprised of a preferably microporous inner portion having a surface area within the range of about 5 to 1,500 square meters per gram, a pore volume of 5 to 70% and containing fissionable material dispersed in grain size less than about 6 microns. Each particle also has a porous outer shell portion, which is substantially free of fissionable material and which has a thickness of a least and preferably in excess of 10 microns, adapted to prevent substantial escape therethrough to the exterior surface thereof of normally solid fission fragments released by fission of the fissionable material in the inner portion. The concentration of the fissionable material in the particles is sufficient to render the mass of contact material, in its environment in the conversion zone under the chemical conversion conditions, including suitable neutron moderation and in the presence of suitable neutron flux, capable of effecting a neutron-multiplying reaction and preferably capable of effecting a self-supporting, neutron-multiplying fission reaction. A neutron flux is maintained in the mass, and the neutrons are moderated so as to promote the neutron-multiplying fission reaction, with resultant release in high energy fission fragments, chemical conversion of the fluid reactant feed and concurrent transformation of some of the kinetic energy of the heavy fission fragments to chemical energy. Where the mass is subcritical, the neutron flux is provided from an outside source, and it may be controlled and moderated either within or outside of the mass and usually both. Where the mass is critical, self-generated neutrons are controlled and moderated in the mass. The neutron flux may be controlled by regulation of the amount of material in the conversion zone having high thermal neutron capture cross-section or by regulation of the amount of moderator and reflector material present or by any combination of these. The neutron flux is so controlled in the mass to promote or insure at least sufficient fission reaction to supply the energy required for the chemical conversion of the fluid reactant feed to the desired products. The contact material is maintained at a temperature level suitable for the chemical conversion and below a level which would cause serious heat damage to the contact material at least in part by removing from the contact material as thermal energy the excess fission energy which has not been transformed to chemical energy. The heat may be removed from the reactor either as sensible heat in the reactant stream or by means of suitable heat exchange media or a combination of both. The temperature in the contact mass may also be controlled in part by control of the neutron flux in the contact material mass.

In one form, operation in accordance with the method of this invention is made continuous by at least periodically withdrawing used particle form contact material from the reaction zone and replenishing the mass in the reaction zone with fresh contact material.

In another form, the contact material mass may be made up of one or more larger bodies in other than particulate form, which are suitably supported and distributed in the reactor between reactant inlet and outlet. Each of these expansive members may be comprised of a suitably supported layer of solid, microporous carrier material containing fissionable material dispersed in grain size less than about 6 microns and having a thickness less than about one inch and of a shell layer of solid, porous material covering the exposed surface of the first-mentioned layer and being substantially free of fissionable material and having a thickness greater than about 10 microns, which is sufficient to prevent initial escape therethrough of normally solid fission fragments released by fission of the fissionable material in the inner layer.

It is very much preferred, in accordance with this invention, that the portion of the contact material body containing the fissionable material be microporous. The outer shell portion must, in all cases, be porous and preferably should contain a substantial proportion of micropores. In these forms of the invention, the fluid reactant passes through the pores of the shell portion into the inner portion. Since some of the heavy fragments from fission of material in the inner portion pass outwardly into but not entirely through the shell portion, the fluid reactants contact numerous sites or surfaces which are under the influence of high energy fission fragments in the shell portion of the body, as well as in the inner portion thereof. It is also contemplated that, within its broadest scope, the invention may also encompass a less preferred form wherein the body's inner portion is not porous. In this case, the fluid reactant comes in contact with many surface sites which are under the influence of high energy fission fragments emanating from the inner portion only in the porous shell portion of the body.

Mechanism

The exact mechanism by which the porous contact material serves its very important function in connection with the chemo-nuclear reaction is not entirely known. However, without any intent that the invention be limited thereto, the following discussion of the probable function of the porous contact material may be helpful to the understanding of the invention. Porous and preferably microporous materials of the type employed present a multitude of pores of small and controlled size distributed throughout a solid capable of retaining shape and volume under handling and operative stresses. Materials to be reacted or transformed, having access to the relatively enormous surface area per unit volume within the micropores, find an environment adapted for reaction or transformation, enhanced in the usual case by numerous active catalytic "sites" existing at or adjacent the walls of the pores. Fissionable material present in the solid bounding the pore walls will, upon fission, give rise to both radiant energy, neutrons and the particles of high mass and high energy spoken of previously. Bombardment of the pore wall material by the radiant energy of fission may, and in many cases will, create electronic anomalies giving rise to "sites" previously non-existent or altering the nature and effectiveness of "sites" already present. Ionizing radiation may cause temporary activation of solid surfaces by electronic excitation and thus bring the surfaces into sufficiently energetic state to cause chemical conversion of fluid reactants contacting such surfaces. Of possibly greater importance is the relatively enormous amount of kinetic energy present in fission fragments of high mass. Such fragments give up their energy by collision processes with the material of the pore walls. Resulting from these collision processes, there may be created both additional electronic anomalies in the material of the pore wall and a great build-up of energy in the material of the pore wall and in other materials which may be associated therewith or which may be found closely adjacent thereto, the total process giving rise both to catalytic "sites" and a supply of energy at relatively high level. This feature is particularly enhanced when the fissionable material is distributed in very fine grain size within the microporous inner portion of the contact material bodies or particles. Very elevated heating of very short duration is provided at a multitude of very small "sites" throughout the microporous inner portion of the particles and through a substantial part of the outer shell portion. This can result in permanent modifications of the structure of the pore walls. Fluid reactants which are in intimate contact with the surfaces which are the seat of short duration, high energy concentrations and surface modifications are caused to undergo chemical conversion or transformation. Fission fragments which come to rest in the fluid reactant present within the pores of the contact material directly impart energy to the reactant at a time when it is in intimate contact or close proximity to active "sites" in the contact material. Carbon-carbon, carbon-hydrogen or other chemical bonds are broken, resulting in production of molecular fragments of the fluid reactants, some of which may be free radicals. Such molecular fragments combine with similar or dissimilar fragments formed in the system so that chemical conversion to different fluid reaction products results. In accordance with the method of this invention, the fluid reaction products depart from the pores of the contact material body or bodies, while the porous outer shell of the body or bodies of contact material imprison the normally solid fission fragments and also prevent loss or entrainment from the zone of any fissionable material in grain or dust form.

*General form of contact material*

The body or bodies making up the contact material mass may be in the form of one or more non-particulate, expansive members of suitable form and shape such as a tube, rod, slab, block or plate. Usually, such "construction members" are formed from sheet-like members. One or more of such members may be suitably supported in the reactor in the path of fluid reactant flow in such a way as to permit reactant flow through the conversion zone at reasonable pressure drop, while still providing for uniform contacting of the fluid reactant material with the contact material and so as to satisfy geometry and other considerations involved in nuclear reactor design. It is much preferred, however, because of considerations involving provision of uniform and extensive contacting between mass and fluid reactant and because of the ease of removing spent contact material and replacing it with fresh material, that the bodies making up the contact material mass in the conversion zone be in the form of solid particles which may have nominal diameters within the size range of about 100 microns to about one inch, preferably 600 microns to one-half inch and usually one-tenth to one-quarter inch. The term "nominal diameter," as employed herein in describing and claiming this invention, refers to diameter or equivalent diameter determined on the basis of particle density and weight measurements from the equation $$D_n = \sqrt[3]{\frac{6}{\pi d_p N}}$$

where $D_n$ is the nominal diameter of the particle in centimeters, $d_p$ is the density of the particle in grams per cubic centimeter and N is the number of particles per gram. The particles may take any of a number of shapes such as spheres, extruded or formed cylinders, pills, tablets, pellets, cubes or even particles of irregular shape. Spherical particles are particularly preferred because of their strength and regularity of shape. It will be understood that the term "particle-form," as used herein in describing and claiming this invention, is employed in a sense sufficiently broad to include particles of any or all of the above-mentioned shapes. It is preferred to employ particles in which the maximum transverse dimension is not more than 5 times the minimum transverse dimension. The term "body" is employed in a sense sufficiently broad to cover one of such particles of contact material or a larger, non-particulate member of other form such as mentioned above.

The mass of particle form contact material may be maintained in the conversion zone in the form of a bed or column which may be fluidized but which is preferably substantially compact. For liquid phase operation, the columnar mass may be maintained in partially expanded condition in order to permit higher rates of liquid throughput.

*Fissionable material-containing portion of contact material*

The inner portion of the body or bodies of contact material may consist of the fissionable material, itself, either as a metal or compound, but it is preferred to disperse the fissionable material in a carrier material. Thus, the inner portion may take the form of a solid carrier material with the fissionable material uniformly dispersed in finely divided grain size throughout the carrier material. On the other hand, when the body is of particle form, the inner portion of the body may consist of an inert core which is free of fissionable material surrounded by a layer of carrier material containing dispersed, fissionable material. This latter arrangement is the subject of claims in my copending application Serial Number 24,123, filed in the United States Patent Office on April 22, 1960. In general, the carrier material in the inner portion of the particles should have a relatively low capture cross-section for thermal neutrons, i.e., below about 10 barns and preferably below ½ barn. In order to attain maximum transformation of the fission fragment energy to chemical energy, it is best to employ a porous, solid material as the carrier material in the inner portion of the mass body or bodies. The surface area of such porous inner portion should be broadly within the range of 5 to 1,500 square meters per gram and preferably within the range of 50 to 700 square meters per gram. The pore volume should be within the range of about 5 to 70% and preferably 30 to 50%. The pore radii may range from about 4 angstroms to 100 microns. Microporous carrier materials are preferred in order to attain maximum chemical conversion and maximum transformation of the kinetic energy of heavy fission fragments to chemical energy. The term "microporous," as employed herein in describing and claiming this invention, is intended to mean porous, solid materials having at least 5% of their volume devoted to pores and at least 25% of the total pore volume devoted to pores having radii less than 100 angstroms. Particles in which a major portion of the pore volume is made up of pores having radii from about 4 to 100 angstroms are particularly well adapted for use in the method of this invention. Measurement of pore size and pore size distribution in various porous materials are discussed by L. C. Drake and H. L. Ritter in Industrial and Engineering Chemistry, Analytical Edition, volume 17, pages 782 to 791 (1945). Methods described there may be employed in determining bulk density, average pore diameter and other pore measurements referred to herein. The term "surface area," as used herein, designates the surface area of the porous contact material as determined by the adsorption of nitrogen according to the method of Brunnauer et al., Journal of the American Chemical Society, volume 60, pages 309 et seq. (1938). The diameter or thickness of the inner portion of the body will depend somewhat upon its shape and composition. In general, the nominal diameter or layer thickness dimension should be within the broad range of several microns up to nearly one inch and preferably within the range of 100 to 10,000 microns.

The composition of porous carrier material for the inner portion of the body may vary widely, depending upon the particular chemical reaction conditions and reactant fluids involved. It has been noted that some porous materials may be more beneficial than others when used for effecting specific chemical reactions in accordance with the method of this invention and that the effectiveness of a particular porous material may depend on operating conditions. In general, the material selected for any given application should have pores in at least the shell portion and preferably also in the inner portion of the particles sized to permit ingress and egress of the fluid reactant involved. In general, it is expected that porous materials which are well adapted as catalysts for chemical conversion of given fluid reactants in the absence of fission fragments will also be well adapted for use in the method of this invention as applied to the conversion of the same reactants, and the advantages of this invention may be expected to result. Exemplary of the types of materials which may be employed for the porous inner portion of the bodies comprising the contact material mass are synthetic or naturally occurring porous and preferably microporous materials, for example, siliceous earths such as diatomaceous earth, infusorial earth and kieselguhr; natural clays and clay-like materials such as kaolin and montmorillonite clays, bentonite, fuller's earth, Superfiltrol, bauxite and porocel; porous ceramic materials such as unglazed porcelain; macroporous refractories such as carbides and silicides and the like; natural or artificial zeolites; molecular sieves such as naturally occurring chabazite, selective synthetic zeolite or aluminum silicate selective adsorbents, for example, calcium aluminum silicate; chamotte; asbestos; pumice; talc; activated carbon, bone charcoal or graphite; hydrosilicates, particularly those of aluminum, synthetic inorganic materials such as activated alumina, magnesium oxide and gels of silica, alumina or silica and alumina or similar gels containing zirconia, chromia or molybdena. The surface area and porosity characteristics of such carrier materials may be, to some extent, regulated by the method of their preparation or treatment. In general, the carrier material is an "inorganic material," this term being employed herein in a sense sufficiently broad to cover activated carbon, graphite, charcoal and bone chars which are essentially carbon, even though, in some cases, such carbons may contain small amounts of hydrogen.

In the case of contact material particles in which the inner fissionable material-containing portion is non-porous, it is desirable to permit a high percentage of the normally solid fission fragments released in the inner portion to enter the porous shell portion so as to release kinetic energy there in the presence of fluid reactants. Hence, in this case, it is desirable to concentrate the fissionable material within a region of the inner portion of the body which is within about 200 microns and preferably 100 microns or less of the shell interphase. If the fissionable material is dispersed uniformly throughout the inner portion of the bodies, then the average thickness or diameter of such inner portion should fall within the above limits. Exemplary of non-porous carrier materials which may be employed for the inner portion of the bodies are fused quartz, silicon, glass fibers, silicon carbide, iron carbide, impervious porcelain, periclase, mullite, zirconium or zirconia, beryllia, iron or iron oxide, nickel, beryllium and Carborundum. The oxides or carbides of iron or preferably beryllium may also be employed as carrier material. In some cases, the more dense materials listed may be mixed with less dense materials, preferably those having good moderating properties, in order to decrease the stopping power for fission fragments.

*Shell portion of contact material*

The outer shell portion of the body or bodies comprising the contact material mass must consist of porous, solid material for reasons already mentioned. In general, the shell material should have a surface area within the range of 5 to 1,500 square meters per gram and preferably 50 to 700 square meters per gram. The pore volume of the shell material should fall within the range of 5 to 70% and preferably 30 to 60%. The radii of the pores should generally fall within the range of about 4 angstroms to 100 microns. Preferably, the shell material should be microporous. When the inner portion of the body is porous, greater than 50% of the pores in the shell portion should have radii greater than 100 angstroms in order to insure rapid diffusion of fluid reactants to and from the porous inner portion of the body. On the other hand, when the inner portion is non-porous, greater than 50% of the pores in the shell portion should preferably be devoted to pores having radii less than about 100 angstroms.

The shell portion must be sufficiently thick to prevent substantial initial escape of normally solid fission fragments therethrough to the exterior surface thereof. (I.e., substantially all of the heavy fission fragments must be brought to a stop within the particles so as to give up their kinetic energy within the particle.) The term "substantial," as used herein in this connection, means that less than about 10% or less of the normally solid fission fragments are permitted to escape the exterior surface of the shell portion of the body or bodies. The minimum shell thickness required to prevent substantial initial escape or preferably to essentially eliminate escape of normally solid fission fragments will depend upon the overall size and shape of the contact material particles and the composition, porosity and density of the shell material. In general, for porous materials of the type contemplated herein, the shell thickness should fall within the range of about 10 to 100 microns and preferably about 20 to 50 microns. For spherical or generally cubical shaped particles of relatively large size, i.e., diameter of about 600 microns or more, a shell thickness of only about 10 microns will prevent substantial initial escape of normally solid fission fragments. For these particles, shell thickness of 20 microns will insure initial retention of essentially all of the normally solid fission fragments. The same is true of large building member bodies having a fission layer 200 microns or more in thickness where two broad surfaces are exposed or 100 microns thick where only one broad surface is exposed. For smaller particle sizes and for particles having small cross-sectional dimensions in one or more directions and for large bodies in which the layer containing fissionable material is substantially less than about 100 to 200 microns, the shell thickness should be at least 20 to 30 microns.

The shell material may take the form of any of a large number of compositions, generally inorganic, depending to some extent on the composition and nature of the inner fissionable material-bearing portion, upon the chemical conversion to be effected and conditions and catalyst characteristics required for such conversion. In general, the shell material should be hard and abrasion-resistant so as to prevent easy breakage, crushing and dusting, and the shell material should be non-corrosive and chemically inert to the reactant fluid. It should have a thermal neutron capture cross-section below about 10 barns and preferably below about 5 barns. In order to prevent cracking due to temperature changes, the shell material should preferably have a coefficient of expansion close to that of the material employed for the inner portion of the bodies. In general, materials of the type indicated above to be useful as porous or microporous carrier materials for the inner portion of the bodies may also be employed as shell material. Other porous or spongy materials which may be employed are oxides of such metals as calcium, barium, nickel and iron in addition to aluminum already mentioned, which are formed by thermal decomposition of carbonates, hydroxides or nitrates of these metals which have been deposited on the exterior surface of the inner fissionable material-containing portion of the body. A recently developed porous form of silicon carbide may be employed in certain applications of the invention. When the inner portion is metallic, the shell portion may take the form of a spongy layer of a suitable metal, such as iron, copper and nickel.

*Addition of catalytic materials*

The shell of the body or bodies and the inner portion, when porous, may be impregnated with certain metals or compounds thereof added because of their beneficial catalytic influence on the chemical reaction involved. Exemplary of such catalysts and supports therefor and reactions for which they are useful are: mixtures of silica with alumina, zirconia or magnesia for the catalytic cracking of hydrocarbons; chromia or molybdena on alumina or cogelled chromia-alumina or molybdena-alumina catalysts for hydrogenation or for dehydrogenation and reforming of hydrocarbons, particularly those in the gasoline boiling range; platinum or nickel on alumina containing small amounts of halogens or on silica gel for isomerization of hydrocarbons; chromia on alumina or on silica-alumina gels for dealkylation of alkyl aromatic hydrocarbons; mixtures of alumina, tungstic acid and ferric oxide (or zinc oxide) for various dehydration or hydration reactions, that is conversion of alcohols such as ethyl alcohol to olefins or the reverse depending upon the specific catalyst and reaction conditions, the oxide mixture may be employed alone after impregnation with fissionable material or it may be mixed with suitable inert porous carrier material in order to increase the porosity of the overall contact material; a mixture of the oxides of copper and tungsten on charcoal for the hydration of ethylene; mixtures of iron oxide with chromia and potassium oxide on suitable carrier such as microporous alumina for dehydrogenation of ethyl benzene to styrene; mixtures of iron oxides promoted with alumina or potassium oxide, usually partially reduced by low temperature gaseous reduction for the Fischer Tropsch or ammonia synthesis, the carrier material in the case may be silica gel, or kieselguhr, for example; vanadium oxide on asbestos for oxidations such as that of naphthalene to phthalic anhydride, or of sulfur dioxide to trioxide; sulfides of tungsten, molybdenum and of iron group metals (Fe, Co, Ni) on suitable support such as alumina for the hydrogenation of coal-tar, heavy oil or sulfur containing material in general; nickel on alumina or silica for conversion of hydrogen and carbon monoxide to $C_1$–$C_4$ gaseous paraffins; mixtures of copper with ammonia with or without added porous inert carrier such as pumice or kieselguhr for hydrogenation of carbonyl and carboxyl containing compounds to alcohols, mixtures of copper and zinc on silica or alumina for the dehydrogenation of alcohols; silver on pumice for dehydrogenation of alcohols, such as the conversion of methanol to formaldehyde and palladium on bone-char for reduction of ketones. When the catalytically active metal or metal compound constituent of the carrier has a relatively high neutron capture cross-section, its concentration in the carrier is restricted to a level, usually below one percent, at which it will not seriously interfere with the neutron efficiency of the system. Such supported catalytic materials, as mentioned above, may be employed in the fission layer or shell layer or both of the contact material bodies used in this invention.

*Preparation of contact material*

Contact material for use in the method of this invention may be manufactured by any of several alternative methods, depending upon the particular characteristics desired. When carrier material employed for the fissionable material-containing portion of the contact material body or bodies is comprised of one of the natural porous or non-porous materials mentioned hereinabove, it may be necessary to treat such material to improve the physical properties thereof and to remove therefrom materials, the presence of which is undesirable from the standpoint of chemical reaction. It may also be necessary in some cases to treat the carrier material with acids or other suitable chemicals to effect removal therefrom of elements having high neutron capture cross-sections such as lithium, cadmium, samarium, gadolinium, boron, cobalt and europium or other undesirable materials such as compounds of nitrogen and sulfur. Alternatively, the carrier material may consist of any of a number of the synthetically prepared solids referred to hereinabove. Such natural or synthetic carrier materials may be formed into particles of desired size and shape by known methods, such as those mentioned hereinafter. The resulting particles can be impregnated with the desired fissionable material and, if desired, with one or more catalytically active metal compounds by soaking with an aqueous solution of a water-soluble, thermally decomposable salt thereof or a solution of a non-water-soluble salt in a solvent which can be removed subsequently from the solid. Thus, for example, a porous alumina may be impregnated with solutions of uranyl nitrate or with molten uranyl nitrate hexahydrate and then heated in a nitrogen stream to decompose the nitrate to the oxide. It is desirable, prior to further impregnation steps, to continue the heating in a hydrogen stream at 800–950° F. until the dew point of the hydrogen is 30° F. in order to reduce the uranium oxide to the dioxide, which is more insoluble. In some cases uniformity of dispersion may be aided by slowly heating the alumina particles in molten uranyl nitrate hexahydrate under elevated nitrogen or hydrogen pressure with bleed-off of $NO_2$ formed so as to maintain pressure of the order of 100 p.s.i.g. The alumina containing uranium dioxide, may be similarly impregnated with a decomposable compound of a catalytically active metal, for example, nickel nitrate, which may be decomposed by heating the impregnated alumina in air and finally reduced by heating in a hydrogen atmosphere. This particular fissionable material-containing catalyst, once the shell portion has been applied, is suitable for use in the method of this invention for hydrogenation of organic compounds, particularly hydrocarbons.

In another method for impregnating preformed carrier cores or layers of the contact material bodies with fissionable material, the carrier material, such as activated carbon, may be impregnated with uranyl acetate solution. Subsequently the impregnated material may be heated to decompose the acetate, carrier streams of nitrogen, or especially of hydrogen being used to avoid oxidative reactions. One method for improving uniformity of distribution of fissionable materials in porous matrix material, which has been described in the literature, involves impregnation of the porous carrier with a solution of uranyl nitrate dihydrate in tertiary butyl alcohol, quick freezing of the impregnated material in liquid nitrogen, sublimation of the solvent below the melting point of the solution by a "freeze-dry" process, followed by heating to 1,340° F.

The impregnation may be accomplished by exposing porous or microporous carrier material to an appropriate gas or vapor form compound of the fissionable material, for example, by use of volatile uranium halides, especially of $UF_6$, and the chlorides. Upon treatment with water and heating, in situ, these halides are converted to oxides of uranium.

Alternatively, the carrier material may be ground to powder form and mixed powdered fissionable material such as an oxide of uranium enriched in $U^{235}$ and, if desired, with oxides or thermally decomposable compounds of suitable catalytically active metals. Instead of dry powder mixing, the powdered carrier material may be contacted with a solution of a compound of the fissionable material and, if desired, with a solution of a compound of the catalytically active metal or metals. A suitable carbonizable binder may be added to the mixture, and the material may then be pelleted or extruded to form particles of the desired shape and size. These may be dried, calcined and, in some cases, heated in reducing atmospheres; and at a suitable stage subsequent to particle formation, the particles may be treated in a suitable manner discussed hereinafter to provide a fissionable material-free, porous shell layer.

Microporous carrier material for the contact material body or bodies may be prepared by formation of suitable colloidal solutions containing hydrous oxides of suitable metals and of silicon, followed by cogelling in a non-aqueous medium to form spherical hydrogel particles. Such particles may be washed free of impurities, cured under specified conditions and calcined to a final form, which is a hard, attrition-resistant spheroid which may have a diameter of the order of one-eighth inch, for example. Such hydrogels as those of silica-alumina, silica-stannic oxide, silica-zirconia, silica-alumina-zirconia, etc. may be formed. Such a method is disclosed by Marisic in U.S. Patent No. 2,384,946. Other materials, such as chromia and platinum, may be incorporated in such bead materials for special purposes. Also, the internal structure, as well as the overall hardness, of such beads may be modified with particular increase in attrition resistance by the incorporation of certain amounts of fines, of the same general composition as the final bead in the material to be cogelled. Also, if desired, substantial amounts of powdered moderator material having effective thermal neutron capture cross-sections below about 100 millibarns, such as beryllia or graphite, may be incorporated in the beads.

Another form of carrier material may be prepared by coprecipitation of, for example, hydroxides of silicon and aluminum or of chromium or molybdenum and of alumina, etc., followed by washing, curing, calcining of the precipitates and pelleting the resultant powdery material.

The fissionable material may be incorporated in the cogelled or coprecipitated porous carrier materials described above by cogellation or coprecipitation, or powdered fissionable material or a compound thereof may be incorporated in the hydrogel or precipitates. For example, a water-soluble salt of the desired fissionable element may be admixed with one or both of the reagents to be gelled or precipitated. For example, to incorporate $U^{235}$ in a silica-alumina bead complex formed by cogellation, a soluble salt, such as, for example, the uranyl nitrate, may be present in the alum ingredient of the reaction mix destined for bead formation after the method of Marisic, 2,384,946. Also, solid materials, such as the oxides of the desired fissionable materials may be incorporated in either of the reaction ingredients as above. Similar methods may be applied where the resultant combination is not a gel, but the result of coprecipitation to form a solid which, after suitable washing and drying operations, is molded, tableted, pelleted, or extruded to form a solid particle suitable for use in the internal portion of the mass bodies.

When the fissionable material-containing layer or core of the contact material bodies is porous, it is possible to treat the porous carrier materials formed in the manners above discussed to effect removal of fissionable material from an outer layer or shell thereof. One method for accomplishing this is disclosed in Weisz, U.S. Patent No. 2,856,367. For example, the porous carrier particle which has been impregnated with fissionable material may be brought into contact with molten wax until the wax has penetrated within the pores of the solid to an extent substantially greater than that desired for the enveloping shell layer. Then, after removal from contact with the wax, and allowing the wax to solidify, the particle is treated with a suitable wax solvent for a sufficient time to remove any superficial wax and also to remove wax from the pores to a depth somewhat in excess of the desired shell layer. After removal of the wax solvent and dissolved wax, the particle is then treated with a leaching agent, such as, for example, dilute nitric acid, capable of leaching out the fissionable material in the shell layer to depth not protected by the wax. After washing and drying, the result is a particle of microporous material containing fissionable material in its interior and having an encasing shell, free of fissionable material and a sufficient thickness to prevent escape to the exterior surfaces of the particle of much of the high mass products of fission.

Alternatively, where the particle is formed by mixing together powdered carrier material and powdered fissionable material, followed by addition of a binder and pelleting, a combustible binder, such as hydrogenated corn oil, may be employed. The formed particles may then be heated in air at temperatures within the range of 400 to 1,100° F. for about 2 to 15 minutes to effect removal of only a portion of the binder by combustion. The portion of the binder removed which may be of the order of 25 to 75% is selectively burned from the outer portion of the porous particles. These particles may then be treated with suitable solution to remove the fissionable material from that portion of the particle from which the binder has been removed. After washing and drying, the particle may be calcined to effect combustion of the remainder of the binder and to convert decomposable metal salts to oxides. If desired, after removal of fissionable material and prior to drying, the particles of contact material may be contacted with solutions of thermally decomposable compounds of metals which may add desired catalyst functions to the fissionable material-free jacket portion of the particles. The same procedure may be employed in the case of particles formed by the method described in U.S. 2,856,367.

When it is desired to add shell base material of the same or different composition to preformed, fissionable material-containing particles, somewhat different procedures may be employed. The particles may be coated in one or more stages with solutions from which hydrogels, gelatinous precipitates or precipitates form. Such coatings should be in the form of thermally decomposable compounds of silicon, aluminum, beryllium or other suitable metals, such as the hydroxides, carbonates or nitrates thereof. For example, particles of silica gel containing dispersed fissionable material may be soaked in an aluminum nitrate solution, after which the particles are added to ammonium hydroxide solution to precipitate alumina gel. The particles are then washed and dried for about 10 to 18 hours at 250° F. The procedure may be repeated until the desired shell thickness has been provided. The particles are finally calcined to provide a porous alumina shell. Similarly, alumina carrier bodies containing dispersed plutonium may be dipped or soaked in ethyl orthosilicate until the particles are saturated. They may then be drained, dried at 220° F., and the procedure may be repeated to provide the desired shell thickness. Final calcination at 1,000 to 1,200° F. provides a silica shell. An analogous method is disclosed in U.S. 2,580,429 and 2,580,806. The method may be extended to non-porous carrier bodies by dipping the non-porous bodies in a dispersion of alumina powder in aluminum nitrate, followed by air drying and subsequent oven drying and calcination. After a suitable porous alumina surface has been applied to the non-porous carrier, for example, porcelain containing dispersed, enriched uranium oxide, the particles may be treated for application of a silica shell in the manner above described. The resulting porous shell may be impregnated, if desired, with suitable metals or metal oxides or mixed oxides, such as platinum, copper, nickel, copper oxide or chromia for specific catalytic effects.

Another method for arriving at the encased material is that shown by Marisic, U.S. Patent No. 2,384,944. In applying this, a microporous material, in rather finely divided or powder form, which microporous material carries fissionable material incorporated therein by coprecipitation, impregnation, or, less desirably, by admixture, is formed into a slurry with a suitable liquid. This slurry is then introduced through the central passage of a compound nozzle, with a composition of hydrosols capable of setting to a hydrogel coming through an annular passage to surround the slurry, the whole being passed into a gel-forming and gel-setting area, followed by suitable finishing of the composite article to give a particle which comprises microporous solid carrying fissionable material and which is encased in a jacket or shell of microporous material substantially free of fissionable material.

In a less preferred form of the invention, the inner portion of the mass body may be comprised of pure metallic fissionable material such as $U^{235}$ or a dispersion of fissionable material in suitable metal such as beryllium or aluminum or zirconium. A spongy metal jacket may be formed on the inner core in such cases by condensation on the core surfaces of metal vapors or by deposition of oxides of iron, copper or nickel on the core surfaces followed by reduction of such metal oxides, especially low temperature gaseous reduction.

While in the above discussion of methods for preparing the contact material mass bodies emphasis has been directed toward particle form bodies, it will be understood that similar techniques may be employed in the preparation of large, non-particulate bodies. In such cases, a porous carrier material may be selected which offers the combination of reasonable structural strength, low neutron capture cross-section and good mderating properties. Such materials may be preformed in the desired shape and size. By methods already discussed, fissionable material and, if desired, certain catalytically active materials may be dispersed on one side of the member to the desired thickness, for example, for a sheet or slab of graphite 2 inches thick, the fissionable material may be impregnated on one side to a depth of about one-tenth to one-quarter inch. The slab is free of fissionable material through the remainder of its thickness and will not only serve as moderator but will prevent escape of normally solid fission fragments from one side of the slab. A suitable shell layer may be deposited over the fissionable material layer and on exposed edges of the slab by methods described above so as to prevent initial escape of fissionable material from the remaining surfaces of the slab. If desired, fissionable material may be dispersed on both sides of the slab, in which case a protectvie porous jacket layer is provided also on both sides of the slab. Beryllium or beryllium oxide is another preferred carrier material. Other carrier materials which may be employed for large body members as well as for particles have been mentioned above, particularly those having thermal neutron capture cross-sections below 10 barns and preferably below 0.2 barn. When the carrier material does not have adequate physical strength, it may be deposited on or bonded to suitable structural support members by known methods. Such support members may be composed of such materials as aluminum, zircaloy (a zirconium alloy containing about 1 to 2% tin and traces of iron, nickel and chromium) and certain stainless steels, for example. Porous layers may be bonded to the support members by such methods as electro-deposition, evaporation and condensation of metal films, applicable powder metallurgy technics, or by some of the methods hereinabove mentioned for bonding porous jacket layers to no-porous surfaces.

*Concentration and enrichment of fissionable material*

In order to transmit to the fluid reactant phase as high a percentage of the fission fragment energy as possible, it is necessary to disperse the fissionable material in grain size substantially smaller than the length of fission fragment path therein (i.e., grain size less than about 6 microns) and to maintain the ratio of the weight of fissionable material to weight of fluid reactant, i.e., ratio of stopping power of fissionable material to stopping power of fluid reactant, as low as possible. From a nuclear standpoint, diminution of the grain size and density of the fissionable material in this manner tends to increase neutron capture by the non-fissionable material present, leading to decrease in neutron economy, and also tends to decrease fuel life. This tendency may be counteracted by control of the concentration of fissionable material in the contact material. In the case of naturally occurring fissionable materials, such as $U^{235}$, this also involves suitable enrichment, e.g., enrichment of the $U^{235}$ content of naturally occurring uranium.

In order to provide a practical efficiency of neutron utilization for promoting nuclear fission and to provide a practical contact material life during operation in accordance with the preferred method of this invention, the lowest acceptable level of concentration of fissionable material corresponds to that minimum at which the amount of fissionable material in the aggregation or mass of contact material in the conversion zone as herein described and its distribution within the space occupied by such mass are just enough, under the environment conditions in the conversion zone during the chemical conversion process operation, including provision of suitable neutron moderation, to permit a neutron-multiplying fission reaction to persist so long as neutrons are introduced into the mass from an outside source such as a radium-beryllium neutron source. "Neutron multiplying fission reaction," as employed herein in describing and claiming this invention, is intended to mean that the nuclear fission conditions in the mass are such that the effective ratio of neutrons existing in the daughter generation within the central material mass to the number of neutrons existing in the parent generation is above about 0.95. This requires such neutron multiplication that even in the minimum case when the mass is subcritical the neutrons which flow into the mass from an external source are multiplied by at least a proportion of 20; but in the minimum case, when the outside neutron source is removed, the neutron-multiplying reaction will stop. While it is contemplated that, in its broadest aspects, the method of this invention may also be employed using contact materials containing less than the above-indicated minimum, for reasons indicated, it is much preferred to provide fissionable material concentrations at least equal to the above-discussed minimum.

It is, of course, contemplated, in accordance with this invention, that the concentration of fissionable material provided in the contact material mass may be and usually will be above the minimum level above discussed; and, in one preferred form of the invention, the amount of fissionable material in the inner portion of the bodies of contact material is sufficient to render the mass of said contact material in the conversion zone, in the environment therein, including suitable neutron moderation, capable of effecting a self-sustaining, neutron-multiplying fission reaction of critical level.

It will be realized that the concentration of fissionable material is not only one of weight percentage, but it is also a matter of the concentration of fissionable material in space; and, therefore, the physical size and shape of the contact material particles and the nature of their packing and percentage of interparticle voids enter into the determination of the concentration of fissionable material in an aggregation of particles. It is well known that the efficiency of neutron utilization for the fission reaction depends upon such factors as the physical geometry of the system and the nature and extent of neutron reflectors employed, both of which affect the amount of neutrons completely lost from the system. Other factors are the degree of enrichment of the material containing the fissionable material, for example, the amount relative to $U^{235}$ of $U^{238}$ which will capture neutrons without fission and the amount and nature of any added special moderator material and other materials, such as the microporous support material and the reactor construction members, present in the mass or in the vicinity of the mass, which are capable of parasitic capture of neutrons. Usually graphite, water and heavy water are employed as moderators in atomic piles. In the present invention, it is advantageous in many cases to employ the reactant fluid itself (for example, hydrocarbons) as moderator and in other cases to incorporate suitable moderating material into the composition of the microporous carrier particles.

Further, with respect to the concentration of fissionable material provided in the contact material in actual operation in accordance with the preferred method of this invention, it is essential that the concentration of the fissionable material in the inner portion of the body or bodies of contact material making up the contact material mass be sufficient to render said mass, in its environment in the conversion zone under conditions of conversion, including suitable neutron moderation, capable of effecting a neutron-multiplying fission reaction in the presence of suitable neutron flux. In one form (A) of the invention, the mass composition, geometry and arrangement in the conversion zone, its environment in said zone during periods of fluid reactant conversion, including the amount and arrangement in or closely adjacent said zone of materials having good neutron moderation and reflection characteristics and of materials having high capture cross-sections for thermal neutrons and the nature and amount of fissionable material in the contact material body or bodies are altogether such that it is necessary to provide a suitably controlled neutron flux from an outside source in order to promote a neutron-multiplying fission reaction, such reaction persisting only so long as outside neutrons are supplied. In another form (B) of the invention, the mass composition, geometry and arrangement and the environment factors mentioned above and the concentration of fissionable material in the contact material are such that the mass is capable of and does effect a self-sustaining, neutron-multiplying, nuclear fission reaction. In this case, it is unnecessary to supply outside neutrons to provide the neutron flux, but the neutron flux in the mass may be controlled by moderators and control materials in a known manner similar to that used for atomic reactors. In still another form (C) of the invention, while the nature, composition and fissionable material content of the contact material are such as to render some aggregate or some aggregates of such contact material capable of effecting a self-sustaining, neutron-multiplying, nuclear fission reaction in the presence of a suitable neutron moderator or moderators, the geometry of the mass and its other environmental conditions in the chemical conversion zone are such that the neutron-multiplying reaction which occurs is subcritical and persists only so long as outside neutrons from some source such as a nuclear reactor are added to the mass. The term "neutron-multiplying fission reaction," as employed herein in describing and claiming this invention, is intended to generically cover all of the above forms (A–C).

It has been found that, if unenriched uranium is dispersed in the microporous contact material, even in relatively high concentration, it is not possible to provide a mass of such contact material which is capable of effecting a "self-sustaining neutron-multiplying fission reaction" and it is unlikely that a mass capable of effecting a "neutron-multiplying fission reaction" could be provided. Hence, when $U^{235}$ is employed as the fissionable material, it has been found essential to the proper conduct of the method of this invention to enrich the $U^{235}$ content of the uranium or uranium compound so that it is substantially greater than the $U^{235}$ content of naturally occurring uranium. The minimum required degree of enrichment will depend upon a number of factors, as will be apparent from the above discussion of required concentration. In general, as the density of uranium in the aggregate decreases, the required enrichment in fissionable isotope increases. By way of example, in the case of uranium, the required enrichment in $U^{235}$ may be within the range of 4 to 80% and more of the total uranium.

It will be apparent from the above that the concentration of fissionable material and its degree of enrichment as incorporated in the porous, particle form contact material which will be required to render the mass capable of a neutron-multiplying reaction or a self-sustaining, neutron-multiplying reaction in accordance with the method of this invention, will vary, depending upon the carrier or support material, the fluid reactants and the operating conditions involved, as well as upon the factors above mentioned and certain other factors which will be apparent to those acquainted with design of nuclear reactors and enrichment of fuel material therefor. The considerations involved in and methods employed in estimating the geometry for self-sustaining nuclear reactors are discussed in detail in many publications, such as Edlund and Glasstone, Elements of Nuclear Reactor Physics, Van Nostrand Co., 1952; Glasston, Principles of Nuclear Reactor Engineering, Van Nostrand Co., 1955; Weinberg and Wigner, Physical Theory of Neutron Chain Reactions, University of Chicago Press, 1958; Bonilla, Nuclear Engineering, McGraw-Hill, 1957; Schulz, Control of Nuclear Reactions and Power Plants, McGraw-Hill, 1955. These publications also include consideration of the various factors influencing efficiency of neutron utilization for promoting nuclear fission and the manner in which these factors must be controlled to convert a subcritical but neutron-multiplying nuclear reactor system into a critical system. Similarly, methods for enrichment of uranium for use as reactor fuel are well known and are discussed, for example, in Cohen, Theory of Isotope Separation, McGraw-Hill, 1951; Glasstone, Sourcebook on Atomic Energy, Van Nostrand Co., 1950; Second Geneva Conference on Peaceful Uses of Atomic Energy, 1958, volume 4 of Proceedings; Etherington, Nuclear Engineering Handbook, McGraw-Hill, 1958; Smyth, Utilization of Atomic Energy for Military Purposes, 1945, Princeton University Press.

"Fissionable material," as used herein in describing and claiming this invention, is intended to mean those materials which undergo nuclear fission as a result of absorption of thermal neutrons. Materials of this type which are presently known are uranium-235, uranium-233 and plutonium-239. The above fissionable materials may be used alone, in admixture with one another, or in admixture with other nuclides which can undergo nuclear reaction with the fissionable materials.

Advantages of invention

By operation of the chemo-nuclear process in the manner herein disclosed, using jacketed contact materials of the type disclosed, it is possible to stop essentially all of the heavy fission fragments within the contact material bodies, whereby the enormous amount of kinetic energy in such fragments is removed therefrom at locations where it is most likely to be transformed to chemical energy and to beneficially affect the action of microporous contact material and the course of the chemical reaction. Fission fragments which are normally gaseous under the conditions of temperature and pressure maintained in the contact material, for example, nuclides of xenon, krypton and, in some cases, iodine and bromine, after transfer of their kinetic energy to the contact material or reactant fluid within the contact material pores, may evenually escape from the contact material by diffusion through the pore passages. Such gaseous fragments are initially radioactive but decay by beta and gamma emission largely to stable nuclides in a relatively short time. On the other hand, the half lives of the radioactive, normally solid fission fragments are, in general, much longer and, depending on the nuclide, the time required for decay to stable nuclides may be a matter of months or years. When the reactant fluid is gaseous essentially all of the normally solid fission fragments are retained within the particle by means of the porous jacket. If the reactant is present as a liquid, it may tend to entrain some fission fragments from the particle pores after they have come to an initial stop in the liquid. However, there is a tendency for the fragments to be filtered out from the liquid and left behind on the pore walls. Also, any low energy solid fragments which eventually should escape from one particle are usually adsorbed onto other porous particles in the bed which acts as a filter bed. Thus, by provision of a protective shell on the contact material bodies adapted to entrap said normally solid, radioactive fragments which might otherwise escape from the surface of the particles and enter the fluid reactant stream, and by separation of fluid chemical reaction products from the contact material and separate withdrawal thereof from the conversion zone, the problem of cooling off and decontamination of the fluid chemical reaction products is greatly simplified. Also, by surrounding the portion of the contact material bodies containing the fissionable material with a porous, protective jacket, loss of fissionable material from the mass in the form of dust or broken particles or grains of carrier material containing fissionable material is prevented. Likewise, undesirable accumulation of such powdered material containing possibly high concentrations of fissionable material in uncontrolled, localized areas of the system is avoided. Moreover, in accordance with the usual and preferred form of the invention, by provision in the conversion zone of a mass of contact material containing within its constituent particles or bodies of an amount of fissionable material sufficient to render the mass capable of effecting a neutron-multiplying fission reaction, practical efficiency of neutron utilization for promoting nuclear fission and practical periods of contact material usefulness are made possible.

DRAWINGS

The method of this invention may be better understood by reference to the drawings of which:

FIGURE 2 is an elevation view, partially in section, of a modified arrangement according to this invention in which the chemo-nuclear reactor is capable of maintaining a self-sustaining, neutron-multiplying fission reaction.

Figure 1:
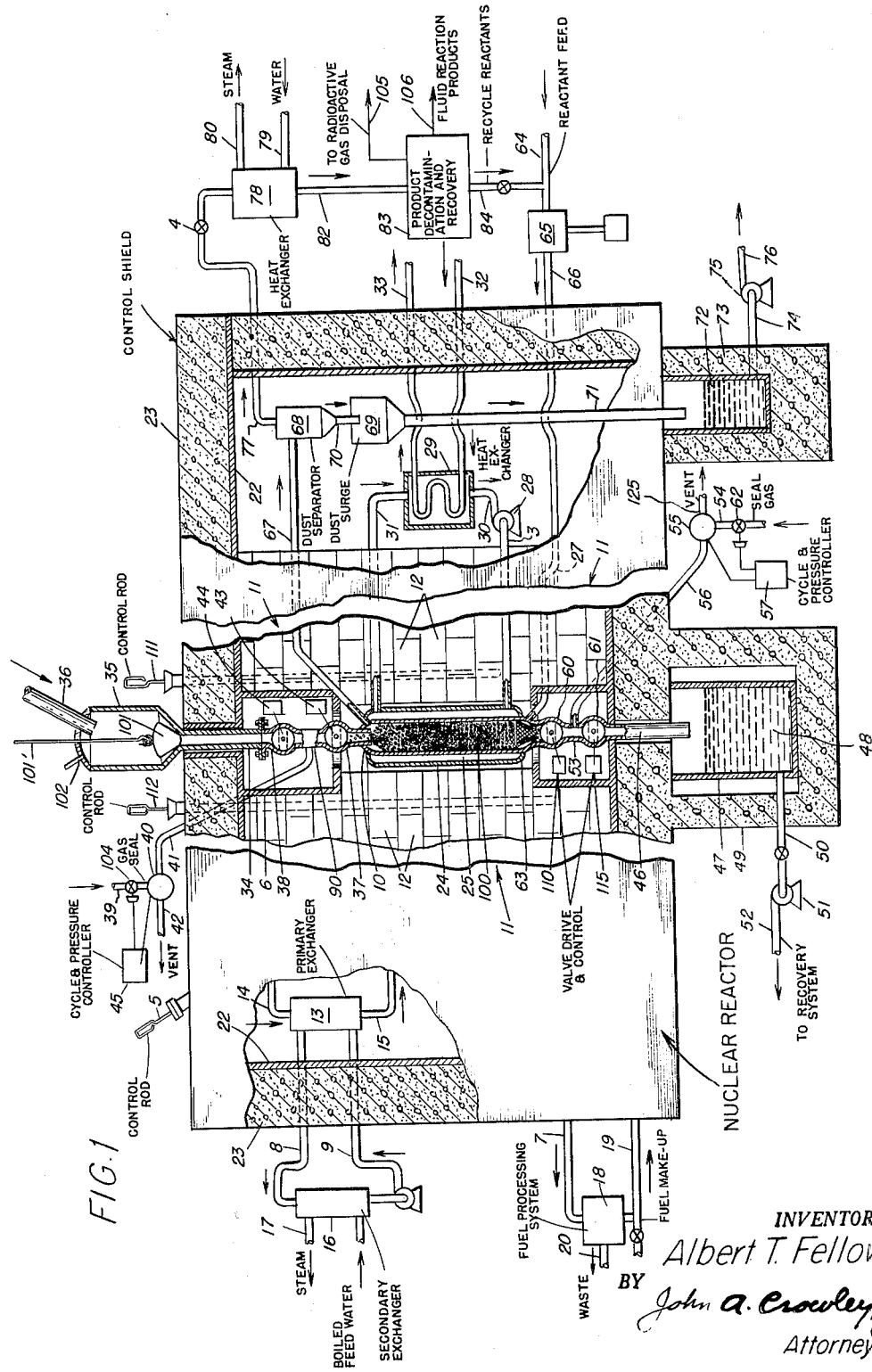
FIGURE 1 is an elevation view, partially in section, of a system for utilizing energy of nuclear fission fragments for chemical conversion of fluid reactants in accordance with this invention.

Both of these drawings are highly diagrammatic and schematic in character.

FIGURE 1

Referring now to FIGURE 1, there is shown an arrangement for conducting one form of this invention wherein the mass of contact material in the chemo-nuclear reactor 10 is incapable of maintaining a self-sustaining, neutron-multiplying fission reaction. In this form of the invention, it is necessary to supply neutrons from an outside source in order to provide a neutron-multiplying fission reaction in the contact mass. In the arrangement shown, the chemo-nuclear reactor is supported by members not shown within a region of high neutron flux emanating from the core of a self-sustaining nuclear reactor. The core of the nuclear reactor is located in or adjacent to the region 11, and the details thereof are not shown in the drawings. One of the control rods for the reactor is shown at 5. A biological shield comprising plates of iron or steel 22 and a wall of dense concrete 23 surround the entire nuclear reactor-chemo-nuclear reaction system. The self-sustaining nuclear reactor may take any of a number of forms known to persons skilled in the art, modified in arrangement to accommodate the presence of the chemo-nuclear reactor in a manner which will be apparent from the following discussion. Thus, for example, the nuclear reactor may be a liquid-metal-fuel reactor such as described by Williams et al. of Brookhaven National Laboratories in Nuclear Engineering, part I, pages 245-252, published by American Institute of Chemical Engineers in 1954. That reactor, which is a power and breeder reactor, utilizes $U^{233}$ in molten bismuth as a fuel, graphite as moderator. Around the reactor core, there is provided a graphite breeder blanket in which $U^{233}$ is bred from thorium bismuthide in liquid bismuth. Another type of nuclear power reactor which may be employed is a modified arrangement of the enriched uranium, heavy water moderated type described by J. T. Wells in Nuclear Engineering, part I (supra) at pages 213, 227. In that reactor, $U^{235}$ is dispersed in aluminum plates as the fuel, and these are mounted in rectangular boxes which are removable as units and arranged for heavy water passage therethrough. Several such units are mounted in an aluminum tank which is surrounded by a graphite filled area to augment the region of useful neutron intensities. Alternatively, the nuclear reactor may be a graphite moderator-uranium reactor modified to permit incorporation of the chemo-nuclear reactor. In one form of the invention, the tube or tubes making up the chemo-nuclear reactor may be mounted in the moderator filled region of high neutron intensity surrounding the core of the nuclear reactor. Referring to FIGURE 1, the graphite blocks represented at 12 can be considered as constituting a portion of the moderator filled region of high neutron intensity adjacent the core of the nuclear reactor. Alternatively, the fission fuel elements of the nuclear reactor may be so arranged in the moderator field with respect to the chemo-nuclear reactor that the latter is essentially within the core of the nuclear reactor. FIGURE 1 can be alternatively taken as also showing this latter arrangement, the graphite blocks 12 comprising the moderator in the reactor core, and the fuel elements of the nuclear reactor being embedded in the moderator but not visible in the drawing. In such arrangement, the contact mass in the reactor 10 is, in essence, a portion of the nuclear reactor fuel, being confined out of fluid communication with the remainder of the fuel mass but being in gamma and neutron radiation communication therewith. With this arrangement, it is preferable that the concentration of fissionable material in the nuclear reactor be sufficient to render some aggregate of the contact material capable of effecting a self-sustaining, neutron-multiplying reaction.

In a preferred form of this invention, the nuclear reactor may be employed for the purpose of producing power as well as serving as an instrument for providing fission fragments of high kinetic energy for use in chemical conversion of fluid reactants. Thus, in FIGURE 1, there is shown a primary exchanger 13 for extracting heat from a heat exchange fluid which has been circulated through the reactor core and which enters the exchanger via conduit 14 and returns to the reactor core via conduit 15. Heat exchange fluid, such as sodium or water, circulates via conduits 8 and 9 between the primary exchanger and the secondary exchanger 16 for the purpose of manufacturing steam from water. The steam passes via conduit 17 to a generator-turbine, not shown.

There is provided at 18 a system of a type known to those skilled in the art for reprocessing the used fission fuel delivered from the nuclear reactor via conduit or duct 7. In the case of liquid fuel reactors, reprocessed and make-up liquid fuel may be returned to the nuclear reactor via conduit 19. Waste material from the fission reaction passes via conduit 20 to a suitable disposal system.

It will be understood that the choice of fissionable and moderator materials, heat exchange fluids, construction materials, the pattern of distribution of the fissionable material in the moderator, the enrichment of the fissionable material and methods therefor, the critical size of the reactive composition comprising fissionable material and moderator required to maintain the self-sustaining reaction, and the means employed to remove the heat generated by the fission reaction, in themselves, do not constitute the present invention, being now known to persons skilled in the art, as exemplified by references cited hereinabove.

Referring now to the chemo-nuclear reactor 10 in FIGURE 1, the reactor shell and other structural members should be constructed of material having as low a neutron capture cross-section as possible while, at the same time, being adapted to dependably confine the reactant fluid and withstand severe corrosion under the temperature, pressure and radiation conditions involved. In general, construction materials employed should have a thermal neutron capture cross-section below about 3 barns. Zircaloy (a zirconium alloy containing about 1 to 2% tin and traces of iron, nickel and chromium), aluminum and certain stainless steels may be employed for the reactor shell. For some low pressure operations, the reactor cavity may be formed in a block of graphite which has been suitably treated to render it essentially impermeable to the reactant fluids involved. A jacket 24 is connected around the reactor shell to provide an annular space 25 through which a heat exchange fluid may be circulated for the purpose of removing heat from the contact mass 100 within the reactor. The fluid is circulated from jacketed space 25 via conduit 31 to heat exchanger 29, thence via conduit 30 to pump 28 and then back to space 25 via conduit 3. Any of a number of suitable heat exchange fluids may be employed, depending upon temperature conditions involved, such as ordinary water, heavy water, usually under pressure, molten bismuth or sodium, suitable mixtures of bi-phenyl and di-phenyl oxide, lead-bismuth eutectic mixture or a suitable molten mixture of sodium nitrate, sodium nitrite and potassium nitrate. The primary heat exchange fluid may be cooled in exchanger 29 by means of water entering via conduit 32 and leaving either as pressurized water or steam via conduit 33. A contact material feed conduit 34 is connected through the closed upper end of the reactor 10 and depends a short distance down into the reactor so as to provide in the upper section of the reactor a plenum space for vapor reactant disengagement from the contact material bed 100. The contact material feed conduit extends upwardly from the reactor 10 to a supply hopper 35 located outside the concrete shield 23. Contact material is supplied to the hopper 35 via chute 36. A removable concrete plug 101 is positioned in the bottom of hopper 35 so as to cover the upper end of conduit 34 during periods of operation when contact material is not being supplied to the reactor. The hopper 35 is closed on its upper end and is provided with a vent 102, which delivers any gas escaping up through conduit 34 to an elevated stack. A seal lock section 90 is provided at an intermediate point along conduit 34 between two automatically operated plug valves 37 and 38. Inert seal gas is supplied to the lock section from supply conduit 39 via three-way valve 40 and conduit 41. The lock section may be vented through conduit 41, valve 40 and vent conduit 42, the latter being connected to an elevated discharge stack, not shown. Valves 37 and 38 are driven by suitable conventional means shown schematically at 43 and 44, respectively, the timing and operation of which are controlled by instrument or instruments 45. The latter instrument or instruments also control operation of three-way valve 40 and the pressure control valve 104 on the inert gas supply conduit 39. The area in which the valves 37 and 38 are located may be shielded against radiation by suitable shield material shown at 6 or the valves may be located outside the biological shield 23. A contact material discharge conduit 46 extends downwardly from the lower end of reactor 10 to discharge tank 47 which contains a pool of water 48. The tank 47 is surrounded with a protective concrete shield wall 49. After the radioactive contact material in the pool 48 has been permitted to cool, it may be pumped from the tank 47 via conduit 50, pump 51 and conduit 52 to a suitable recovery system, not shown, in which it is processed for recovery of unused fissionable material and other values. A seal lock section 53, similar to section 90, is provided on conduit 46 between automatic plug valves 60 and 61. Inert gas is introduced to lock section 53 via conduit 54, three-way valve 55 and conduit 56. Cycle and pressure control instrument 57 controls the operation of the drive mechanism for valves 60, 61 and 55 and also controls the pressure control valve 62 on the seal gas inlet conduit. A vent to stack 125 is also connected to the three-way valve 55. Adjacent the location at which the conduit 46 connects into the bottom of the reactor 10, there is provided a ring-shaped foraminate partition or screen 63 shaped to permit attachment along its edges to the side shell and bottom of the reactor so as to provide an annular plenum space for fluid reactant distribution. Fluid reactant feed is delivered into the space provided by screen 63 through conduit 66, which connects through the reactor shell at the location of the distribution space. A conduit 67 connects into the upper section of the reactor 10 above the discharge end of conduit 34 and connects on its other end into dust separator 68. A dust surge tank 69 is positioned below separator 68 and communicates therewith through separator drain conduit 70. A drain conduit 71 extends downwardly from surge tank 69 to the water pool tank 72, which is shielded by concrete wall 73. Radioactive contact material dust may be discharged from tank 72 via conduit 74 and pumped by pump 75 through conduit 76 to a suitable processing plant for recovery of fissionable material. Fluid conversion products may be passed from the top of separator 68 via conduit 77 to heat exchanger or boiler 78, in which the products are cooled with resultant vaporization of cooling water entering via conduit 79. The resulting steam may be passed via conduit 80 to a generator-turbine or utilized for other purposes.

Cooled products from chemical reaction pass from exchanger 78 via conduit 82 to suitable product decontamination and recovery system 83. A conduit 84 leads from system 83 to feed pump or compressor 65 for recycling of reactants.

FIGURE 1—Operation

For the purpose of discussing the operation of the arrangement shown in FIGURE 1, its use for the chemical conversion of a mixture of steam and propane vapor to carbon monoxide and hydrogen at about 800–1000° F. may be considered. This reaction takes place only after supply of substantial amounts of free energy. The contact mass employed in this instance is comprised of generally rounded pellets of microporous alumina, having an inner portion containing dispersed uranium and nickel and a microporous alumina jacket containing dispersed nickel. The inner portion of the contact material particles is prepared by mixing measured amounts of aqueous aluminum chloride solution and uranyl nitrate solution followed by adding to this solution sufficient concentrated ammonium hydroxide to bring the pH of the final mixture to about 8.5, whereupon aluminum and uranium are precipitated. The precipitate is filtered, washed with dilute ammonium hydroxide solution, and then the wet precipitate is impregnated with a measured quantity of nickel nitrate. Thereafter, the material is slowly heated in air for several hours at 200 to 300° F. to dry. Rounded pellets of contact material are formed from a paste of the dried material. The pellets are dried, calcined in air for about 12 hours at 1,200° F. and then reduced by heating at 900 to 1,000° F., in a stream of hydrogen, for about 4 to 8 hours, or until the dew point of the exit hydrogen is not above 30° F. The pellets are then soaked in an aluminum nitrate solution, after which ammonium hydroxide solution is added to precipitate alumina gel. The particles are washed and dried for about 10 to 18 hours at 250° F. This procedure is repeated to provide suitable jacket thickness. The dried pellets are impregnated with nickel nitrate solution, then again dried and calcined in air for about 12 hours at 1,200° F. and again heated in a rapid steam of hydrogen at 800–950° F. until the dew point of the hydrogen is reduced to about 30° F. The resulting microporous particles are about 3 millimeters in overall nominal diameter and have an average loose bulk apparent density of about 100 pounds per cubic foot. The surface area of the contact material is about 300 square meters per gram, and the pore volume is about 35% of the total particle volume. The micropore volume is about 90% of the total pore volume. The particles have a microporous inner portion containing very finely dispersed uranium enriched to about 80% in $U^{235}$. The amount of uranium in the particles is about 8% by weight calculated on total particle basis. The particles have a microporous outer shell of alumina having a thickness of about 75 microns which is essentially free of fissionable material. Both the inner and outer portions of the particles contain about 5% by weight dispersed nickel.

The contact material mass is arranged in the reactor 10 in the form of a substantially compact bed 100. The microporous alumina carrier material to a certain extent will act as moderator for neutrons released by fission of the fissionable material in the pellets. To provide additional moderation, graphite spheres of approximately the same particle size as the contact material are uniformly mixed with the contact material pellets in the bed 100. The volume of the graphite spheres is approximately equal to the volume of the alumina pellets.

The reactor 10 is so positioned in the graphite blanket surrounding the nuclear reactor that the thermal neutron flux radiated through the walls of the reactor and into the contact mass is, in the absence of control rods, of the order of $1 \times 10^{11}$ to $1 \times 10^{12}$ neutrons per square centimeter per second. As a result, the $U^{235}$ in the contact material is caused to undergo fission. In this case, the amount of the mass 100 and of the fissionable material therein is such that the mass 100 is incapable of supporting a self-sustaining, neutron-multiplying reaction, but is capable of a neutron-multiplying reaction as long as outside neutrons are irradiated into the mass. The gaseous reactant feed stream consisting of about 80 mole percent steam and 20 mole percent propane is supplied via conduit 64 to compressor 65 and is forced through through conduit 66 into the bottom of reactor 10. If desired, the feed may be preheated to reaction temperature in a suitable heater (not shown) inserted between the compressor 65 and the reactor 10. The reactant gas passes upwardly through the mass 100 at a pressure of about 5 p.s.i.g., controlled by valve 4, whereby it is converted as a result of contacting the microporous particles in the presence of high energy fission fragments resulting from fission of the $U^{235}$. Fluid conversion product containing hydrogen, carbon monoxide and unconverted feed material is withdrawn from the upper section of reactor 10 via conduit 67. Any small traces of contact material dust or carbon formed in the reaction separate in dust separator 68, which may take any of a number of known forms adapted for the purpose. Separated dust falls into the surge tank 69 and from thence via conduit 71 into the pool of water in tank 72. Conversion product passes from separator 68 to exchanger or boiler 78, where it is cooled by indirect heat exchange with water. The cooled product passes to system 83, where it is treated in suitable manner to eliminate dangerously radioactive materials and then subdivided to the extent desired by conventional methods into constituent chemical components which are withdrawn at 106. As has been pointed out hereinabove, due to retention of normally solid fission fragments in the contact material, the decontamination process is substantially simplified. In general, this involves separation of radioactive gases (withdrawn at 105) and permitting the chemical products to "cool" for sufficient time to permit decay to a safe level of any radioactive isotopes formed as a result of subjection of the reactant fluid to irradiation in the reactor. Methods for effecting radioactive decontamination of fluid chemical materials are known to those skilled in the art and are based on combination methods which vary somewhat, depending upon the materials involved. In general, these methods rely on aging to permit decay of radioactive materials, followed by filtration through fine filters or porous adsorptive materials to remove the solids into which these materials decay. It will be understood that methods for effecting decontamination and separation of fluid chemical products are not, in themselves, the subject of the present invention.

The contact material in reactor 10 is maintained at the desired conversion temperature, in this instance about 800–1,000° F. by heat exchange with suitable cooling fluids circulated through the jacketed space 25. When the concentration of fissionable material in the contact material is high in accordance with the preferred form of the invention, the fission reaction releases energy in excess of that required for the chemical conversion. The excess energy is converted to heat. This heat is also recovered in the form of steam in exchanger 29. In some cases, particularly where the reactor is small, it may be desirable to circulate a suitable heating fluid through the jacket space 25 to counteract convection and radiation heat losses from the reactor, leaving it to the fission reactor to supply only the energy required for the chemical conversion.

After a sustained period of use, it may be necessary to replace the contact material either because of accumulation of contaminants deposited during the chemical reaction (in this case, carbonaceous contaminants) or because of accumulation of undesirable fission fragments and gradual depletion of $U^{235}$ in the contact material. It is contemplated that the chemo-nuclear reactor may be operated while contact material is supplied to and withdrawn from the reactor in an essentially continuous manner. However, for most operations, complete change of contact material in the reactor may be made only during infrequent off-stream periods, or the contact material may be changed batchwise by withdrawing and replacing small portions of the reactor bed periodically during the reactant conversion period. During periods when contact material is not being charged to or discharged from the reactor 10, the plug valves 37, 38, 60 and 61 are in closed position, and an inert gas such as steam, helium, carbon dioxide, etc. is admitted to the lock chambers 90 and 53 via conduits 41 and 56, respectively. By means of control instruments 45 and 57, and pressure control valves 104 and 62 which are actuated thereby, the inert gas pressure in the closed lock sections 90 and 53 is maintained at about ¼ to ½ pound per square inch above that in the reactor 10, thereby preventing escape of reactants or other gases from the reactor via conduits 34 and 46. In this respect, the instrument systems 45 and 57 serve the function of differential pressure control instruments. When it becomes desirable to discharge contact material from the reactor 10, instrument system 57 is caused to change the setting of the three-way valve 55 so as to close off admission of inert gas via conduit 54 and to vent the gas from the lock chamber via vent 125. Thereafter, by means of suitable control instruments in system 57 which control the operation of drive mechanisms 110 and 115, valve 60 is caused to open for a measured time so that a portion of the mixed contact material and graphite pellets from reactor 10 flows into lock section 53. If desired, inert purge gas can be caused to enter the section 53 during this period so as to purge reactants from the contact material. Valve 60 is closed before the section 53 becomes filled with contact material. Valve 61 is then similarly caused to open, and the contact material falls from section 53 into the water pool 48. Thereafter, valve 61 is closed, and inert gas is again admitted to the lock section 53 so as to maintain the desired seal pressure therein. By a similar operation of lock section 90, fresh contact material mixed with graphite pellets is supplied onto the top of the bed 100 in order to replace the portion of the contact material which has been removed.

*Neutron moderators*

Instead of mixing separate particles of moderator with the particles of contact material in order to thermalize neutrons released by fission, moderator material such as graphite or beryllium oxide may be incorporated in the contact material particles during manufacture. In general, such material should have a capture cross-section for thermal neutrons less than 0.2 barn and preferably less than about 100 millibarns. Alternatively, a portion of the reactor structural members may consist of graphite or beryllium or a compound of beryllium, or uniformly spaced rods or bars may be positioned across the portion of the reactor occupied by the contact material bed. Additional moderation may be obtained in some cases by employing water or heavy water as the heat exchange fluid circulated through the cooling tubes or jacket in the reactor. When the fluid reactant is a hydrogenous material such as hydrocarbons or hydrocarbon derivatives, the fluid reactant stream serves at least in part as the moderator. When the hydrocarbon reactant is in the liquid phase it is especially effective as a neutron moderator because of its increased concentration. Also, a moderating material such as heavy water, light water, hydrocarbons or hydrogen may be added to the fluid reactant stream to augment the moderator properties of the reactor system. It will be understood that the terms "effective moderator" or "good moderator material," as used herein in describing and claiming this invention, is intended to include carbon, graphite, beryllium, beryllium oxide, heavy water, ordinary water, hydrogen, deuterium, hydrocarbons, and such other materials which have equivalent properties for thermalizing neutrons.

Control of neutron flux

Depending upon the condition of the contact material and desired severity of reaction and the rate of reactant flow through the reactor, it is necessary to adjust the neutron flux in the contact material mass from time to time in order to promote fission of the fissionable material in the microporous solids at a rate at least sufficient to provide the energy required for the desired chemical conversion or transformation of the fluid reactants. The neutron flux in the mass may be controlled either by control of the number of neutrons present or by control of the neutron speed by moderation. One way of adjusting the amount of moderator in the reactor is by controlling the amount of neutron moderating material in the fluid reactant feed and by controlling the rate of fluid reactant feed flow through the reactor. While it is undesirable to add to the feed materials having very high neutron capture cross-sections, it will be understood that frequently some components of the fluid feed stream may have higher neutron absorption capacities than others. Hence, to some extent, the neutron flux in the mass may be influenced by control of the amount of neutron absorbing material in the feed and the rate of feed flow through the conversion zone. In the system shown in FIGURE 1, the neutron flux may be adjusted by insertion into or withdrawal from the mass within the reactor of cadmium-containing or boron-containing control rods through suitable sheaths (not shown). Alternatively, the neutrol flux in the contact mass may be controlled by regulating the thermal neutron flux in the region in which the reactor 10 is located. Thus, where the reactor is positioned in a graphite-filled region adjacent the nuclear reactor core, cadmium-containing or boron-containing control rods may be inserted into or withdrawn from the graphite blanket at points around the reactor 10. Two such rods 111 and 112 may be seen in the drawing.

Alternative arrangements

As indicated above, when the mass of contact material in the reactor is itself incapable of effecting a self-sustaining, neutron-multiplying reaction, an atomic reactor is the preferred outside source of neutron supply. However, it is contemplated that neutrons may be supplied by other means, for example, the provision around the outside or inside of the reactor of suitably clad capsules or members containing a mixture of metallic beryllium and an alpha particle emitter such as radium or a polonium compound. Other possible neutron sources are antimony containing 60-day Sb-124 surrounded by metallic beryllium, or a mixture of Pu-239 and beryllium.

While, in the arrangement of FIGURE 1, only a single reactor tube of relatively small diameter, surrounded by a cooling jacket, is shown, modified arrangements are contemplated for reactors of greater capacity. For example, large reactors may take the form of a tube and shell type vessel with the contact material positioned either inside or outside of the tubes while the liquid heat transfer fluid is circulated through or around the opposite sides of the tubes. In arrangements of this type, the external neutron source may be desirably positioned within the reactor shell, either within or without the tubes therein, in order to provide uninform neutron flux in all portions of the contact material mass.

In other alternative arrangements, provision for cooling or heating the contact material mass by indirect heat transfer may be omitted in whole or in part and the rate of fluid reactant flow through the mass and the inlet temperature thereof may be regulated to effect, in whole or in part, heating when necessary and, more frequently, removal of excess fission energy from the mass as increased sensible heat in the conversion product stream. This may be accomplished by diluting the fluid reactant stream with a suitable heat-carrying fluid which is of low neutron capture cross-section and which may be essentially inert under reactor conditions or by recycling unconverted reactant (in this case, propane and steam) from the product recovery system 83 to the reactor via conduit 84, compressor 65 and conduit 66. If desired, a portion of the total cooled reaction product stream withdrawn from exchanger 78 may be bypassed around the product recovery system 83 and recycled to the reactor 10. In this manner, the temperature of the mass 100 may be controlled, and, at the same time, the concentration of desired products in the portion of the product stream supplied to the product recovery system 83 may in some cases be increased.

Beyond the limit of providing sufficient fission in the microporous solids to effect the desired chemical conversion of the fluid reactants, the thermal energy released in the reactor 10 may be controlled by control of the neutron flux maintained in the contact material mass. As indicated above, this can be accomplished by adjustment of control rods 111 and 112.

In general, only a relatively small fraction of the kinetic energy of the fission fragments released upon fission of the fissionable material in the microporous solids is ultimately converted to chemical energy, and the remainder is converted into thermal energy. It is, therefore, very desirable from the standpoint of overall economics of the system to recover the excess energy from the fission fragments which has not been converted to chemical energy in a form which can be converted to power as shown hereinabove in connection with exchangers 29 and 78.

In order to prevent contamination of the microporous contact material with materials having a high neutron capture cross-section such as boron, cadmium, antimony, cobalt, lithium, etc., the fluid reactant feed should be treated, if necessary, to remove such materials prior to passage through the reactor. Usually, it is preferred also to exclude sulfur and nitrogen and compounds thereof, except in the case of certain chemical conversions necessarily involving these materials.

FIGURE 2

Referring now to FIGURE 2, there is shown a modified chemo-nuclear reaction system in which the geometry and arrangement of the reactor and contact material mass and the concentration of fissionable material are such as to render the mass capable of effecting a self-sustaining, neutron fission reaction. Suitable moderation for the neutrons released by fission occurring within the particles being provided, an outside source of neutrons is not required for operation of this system other than as an aid in its start-up. The contact material may be made up of ¼ inch nominal diameter microporous activated carbon particles comprised of an inner portion containing uranium and a 50-micron thick outer shell portion which is essentially free of fissionable material. These particles are prepared by impregnating preformed, pelleted, activated carbon particles with uranyl acetate (enriched in $U^{235}$) and drying. The pellets are then heated in inert or reducing atmosphere to decompose the acetate to an oxide.

The pellets are then soaked in molten wax, using a method analogous to that described in U.S. Patent No. 2,856,367, and thereafter wax on the outer shell portion of the particles is removed by controlled solvent washing. The uranium is then dissolved from the shell portion of the pellets using suitable acid solution such as dilute nitric acid. Thereafter, the pellets are washed, solvent treated to remove the remainder of the wax, dried, heated at elevated temperature under an inert or reducing atmosphere and finally heated in a hydrogen atmosphere at 800–950° F. until the dewpoint of the hydrogen is about 30° F. in order to reduce the uranium. The final particles contain 20% by weight uranium enriched to 60% $U^{235}$. In this arrangement, the microporous carrier material also serves to thermalize the neutrons released by fission of the $U^{235}$ in the particles. The size of the contact material bed 204 is such that the total amount of $U^{235}$ therein is about 6 kilograms.

The reactor 200 has a stainless steel shell 201 and jacket 24 and an internal lining of beryllium oxide 202 which acts as a neutron reflector. The lower section of the reactor is expanded in cross-section to provide an annular reactant withdrawal space 203 which is separated from the critical mass of contact material 204 by a ring-shaped screen or perforated plate baffle 205. The baffle 205 is fastened to the vessel shell by suitable braces shown at 206, 207 and 208. The jacket heat exchange system, the fluid reactant feed arrangement and product recovery system and the means for adding contact material to the reactor and withdrawing contact material therefrom are all similar to those shown in FIGURE 1 and bear like legends. These features require no further description other than mention of points of minor difference. The reactant manifolding differs from that shown in FIGURE 1, principally in providing for downward flow of reactant fluid through the bed 204 rather than upward flow. This permits somewhat higher reactant throughout velocities without disturbance of the contact material bed. The fluid inlet conduit 66 is closed on its end 209 within the reactor, and lateral openings 210 are provided so that entering vapors do not impinge directly down onto the bed surface. While the arrangement shown may be employed for liquid phase operations, it is preferred for vapor phase operations. It will be understood that, for liquid phase operations, somewhat modified arrangements may be provided for distribution of the liquid feed onto the bed 204 and for withdrawal of liquid products therefrom. Such modified arrangements are well known to those familiar with design and operation of reactors adapted for contacting of liquid reactants with beds of particle form contact materials. The same is true of the equipment employed for separation of entrained dust from fluid conversion products.

A plurality of control rod sheaths, of which two are shown at 220 and 221, connect through the top of reactor 200 and depend down into the reactor. Cadmium- or boron-containing control rods 217 and 218 may be inserted or withdrawn from these sheaths from a location outside the biological shield 219. It will be noted that the biological shield 219 encloses the reactor, jacket exchanger and product dust separation system. If desired, the exchanger 78 must also be positioned within the shielded area, and a normally liquid primary cooling fluid may be substituted for water in this exchanger. In this case, the primary cooling fluid from exchanger 78 is circulated to a secondary exchanger or boiler, not shown, in which heat removed from the conversion product is exchanged with boiler feed water.

Suitable contact material storage tanks, not shown, may also be provided within the shielded area for storage of the contact material when the reactor 200 is not in use. These tanks should be of such limited size and suitably separated from each other as to permit storage of the contact material without danger of self-sustaining fission reaction occurring. A suitable contact material transfer system 225 is connected to the discharge end of conduit 46 for transfer of discharged contact material to the storage tanks.

FIGURE 2—Operation

In operation of the system shown in FIGURE 2, the mass of contact material 204 becomes critical upon withdrawal of a suitable number of control rods 217 and 218. The extent of the fission reaction may be regulated by means of the control rods, and the fission reaction may be stopped by inserting a sufficient number of the rods into the sheaths 220 and 221. As indicated hereinabove, the neutron flux and amount of fission occurring may be controlled at least in part by regulation of the amount of neutron moderating material in the confined zone, for example, by adjusting the amount of moderator material such as steam added to the conversion zone with the reactant feed. The neutron flux in the mass 204 is usually maintained at an intensity level of the order of $10^{12}$–$10^{13}$ neutrons per square centimeter per second.

Alternative arrangement

In the arrangement shown in FIGURE 2, the temperature in the mass 204 is controlled at the desired level principally by recycling fluid reactant, cooled to a temperature substantially below the desired conversion temperature, and controlling the total rate of reactant flow through the reactor. A minor portion of the excess thermal energy may be removed by means of the jacket heat exchange system. It is also contemplated that heat transfer tubes may be provided inside the reactor to remove most or all of the excess energy released by the fission reaction. In one modification of this general type, the chamber portion of the reactor system may be in the form of a graphite block having a plurality of laterally spaced passages extending vertically therethrough, in which the contact material is placed, and a second plurality of interconnected passages extending within the block between the first-mentioned passages for circulation of the heat transfer fluid. The graphite employed for this purpose should be treated to render it impervious to the reactant fluids which are to be converted. The graphite also serves as a moderator in this arrangement.

In an alternative operation of the system shown in FIGURES 1 and 2, the geometry of the contact material mass and concentration of fissionable material therein may be such as to render the mass capable of effecting only a subcritical neutron-multiplying reaction and removable rods or strips containing a high concentration of fissionable material may be inserted into the mass when desired to render the entire assembly, including the rods, critical, whereby a self-sustaining, neutron-multiplying reaction is effected in the chemo-nuclear reactor. Such rods may be adjustably inserted into sheaths such as those shown at 220 and 221 in FIGURE 2 and may be removed when it is desired to stop the fission reaction, the rods in themselves being incapable of sustaining a self-sustaining, neutron-multiplying reaction.

It will be understood that suitable heat-insulating material may be provided around the shells of the chemo-nuclear reactors shown in FIGURES 1 and 2 when chemical reactions are conducted therein at temperatures substantially above or below atmospehric temperatures.

Applicability of invention

The method of the present invention is broadly useful in the conduct of a very large number of chemical conversions and transformations of different types. In general, the invention is applicable to chemical conversions or transformations of fluid reactants (i.e., liquid or gaseous reactants) to products which are at least mostly fluid and are of different chemical composition, which conversions or transformations require supply of substantial amounts of energy. It should be understand that reference herein, in describing and claiming this invention, to conversions or transformations which "require supply of substantial amounts of energy" is intended to mean:

(A) Chemical conversions or transformations which can be effected only by supply of a substantial quantity of free energy. This includes highly endothermic reactions among certain others.

(B) Conversions or transformations not requiring supply of a substantial quantity of free energy but requiring supply of a substantial quantity of activation energy in order to effect their progress.

The invention is not particularly useful for the conversion of reactants which are and remain solids under the conversion conditions, nor is it particularly useful for those fluid conversions which, under the conditions employed, cause very rapid deposition on the microporous solids of materials which permanently clog the pores of the contact material so as to prevent successful use of the microporous solids over practical operating periods. Also, where the conversion may be started and will continue indefinitely spontaneously or upon supply of only small amounts of energy, the use of the present invention is unnecessary. The uncontrolled combustion by burning of gaseous and light liquid hydrocarbon fuels is an example of the latter type of conversion. Usually, the invention would not be employed for strongly exothermic chemical reactions except in those cases where the reaction will not initiate except upon supply of a substantial quantity of initial energy. For practical reasons, the invention is not applicable to conversions in which the reactants have thermal neutron capture cross-sections above about two barns. Reactant feeds which, or feeds leading to conversion products which, under the process conditions, cause serious permanent impairment of those properties of the contact material which render it useful for the chemo-nuclear process, or are generally not employed in the process of this invention. The same is true of feeds which remove or cause removal from the porous contact material by solubilizing or leaching of contained catalytic compounds or of fissionable material or of the retained normally solid fission products, except in such cases where the solubilizing or leaching action is specifically desired. In some cases specific reactants may be objectionable only in the case of certain contact materials, for example, water and water vapor at high temperatures would react with an activated carbon but would not be objectionable where the porous carrier material is pumice. It is necessary to exclude chlorine and compounds thereof where the contact material contains aluminum, iron chromium and uranium and the operating conditions would be such that volatile chlorides of these metals would be formed.

Examples of a large number of chemical reactions which may be caused to occur by subjection of the reactants, either in the presence or absence of porous or catalytic solid materials, to irradiation by alpha particles, neutrons, beta rays or electro-magnetic gamma radiations have been disclosed in prior art cited hereinabove. Similarly, examples of chemical reactions which may be caused to occur in the presence of nuclear fission fragments, either in the presence or absence of porous contact materials, have also been disclosed in some of the prior art references hereinabove referred to. Within the limits of the applicability of this invention outlined in the two paragraphs next above, the method of the present invention may be applied to the many different chemical conversions described in the above-mentioned prior art with the resultant advantages which have been indicated herein to be derivable from this invention. Other chemical conversions and transformations to which this invention is applicable and the types of porous contact materials which may be used in that connection have been specifically mentioned hereinabove in connection with the discussion of the microporous carrier material and of compounds which may be added to said carrier for the purpose of providing beneficial catalytic influence on the chemical reactions involved. Without any intention of limiting the scope of the invention thereto, some typical chemical conversions to which the method of the present invention may be beneficially applied and which appear worthy of further mention are listed hereinbelow:

(A) Chemical reactions of the type wherein a carbon-hydrogen, carbon-carbon or other chemical bond is ruptured with resultant formation of molecular fragments which recombine to form dimers; for example, the conversion of methanol to diethylene glycol and hydrogen over a mass made up of porous particles composed of pumice, kieselguhr, diatomaceous earth or silica gel containing dispersed fissionable material in their inner portion and having outer jacket portions which are free of fissionable material. Temperatures employed in the chemo-nuclear reactor may be of the order of 50 to 200° F., and pressures may range from atmospheric to 200 p.s.i.g. Another reaction of this type is the conversion of monocarboxylic acids to dicarboxylic acids.

(B) Reactions between dissimilar organic compounds wherein fragmentation of the molecules of each compound occurs and these fragments may combine with like or dissimilar fragments to produce a mixture of products. An example of such a reaction is the conversion of an ethanol-hexane mixture to butanediols, octanols and dodecanes. The contact material in this case may be pumice, kieselguhr or silica gel impregnated internally with fissionable material and being free of fissionable material throughout an outer jacket portion, and conditions in the chemo-nuclear reactor may include temperatures in the range of 50 to 200° F. and pressure of the order of atmospheric to 10 atmospheres.

(C) Synthesis reactions, for example, the conversion of nitrogen and oxygen to oxides thereof at 200 to 400° F. and 5 to 20 atmospheres, in the presence of contact material particles having a porous silica gel inner portion impregnated with fissionable material and an alumina shell portion which is free of fissionable material. Another example is the synthesis of ammonia from nitrogen and hydrogen over a contact material prepared by coprecipitating hydroxides of uranium, iron, and of smaller amounts of aluminum from nitrate solutions thereof with ammonium hydroxide, washing, mixing with silica gel, forming, drying and calcining; then impregnating the whole with promoter amounts of potassium and subjecting the material to a reducing atmosphere comprising a rapid stream of hydrogen at 800–950° F. until the dewpoint of hydrogen is about 30° F. An alumina shell, free of fissionable material, is formed around the particles by the method described hereinabove. Operating temperatures and pressures are somewhat lower than those employed in the art for effecting this conversion by ordinary catalysis. Another example is the synthesis of methane from carbon monoxide and hydrogen over alumina containing nickel and uranium. Such contact material is prepared by impregnating microporous alumina particles of suitable size and shape with uranyl nitrate, followed by heating in a nitrogen stream to convert the nitrate to the oxide of uranium. The uranium is removed from a 100 micron thick shell layer of the particles by leaching with dilute nitric acid after treatment with wax in the manner hereinbefore described. Thereafter the wax is removed and the particles are then impregnated with nickel nitrate, followed by heating in a nitrogen stream to decompose the nitrate. The particles are then treated with hydrogen at 800–950° F. to reduce the nickel and uranium oxides. The chemo-nuclear conversion is conducted at 100–600° F. and 1–10 atmospheres.

(D) Decomposition of stable compounds, for example, decomposition of carbon dioxide to form carbon monoxide and oxygen in the presence of a fissionable material carrier comprising pumice or silica gel and in the presence of small quantities of added nitrogen dioxide. In the case of pumice, fissionable material is leached out of an outer shell portion during preparation. In case of silica gel an alumina shell is added. Moderate conditions of temperature and pressure may be employed in the chemo-nuclear reaction zone. Another example of this type is the radio-catalytic decomposition of methane or other simple hydrocarbon gases to form hydrogen and hydrocarbons of higher molecular weight, usually those having from 2 to 6 carbon atoms per molecule. This conversion may be conducted over microporous alumina containing fissionable material in the concentration disclosed herein at temperatures in the range of 50 to 400° F. and pressures in the range of 5 to 15 atmospheres. The particles are provided with an alumina shell which is free of fissionable material. Another reaction of this general type is the decomposition of water in the presence of microporous solids containing fissionable material.

(E) Hydrogenation of hydrocarbons and other organic compounds and sulfur compounds. As an example, olefinic gasoline may be hydrogenated over a catalyst comprising alumina impregnated with nickel or platinum and containing suitable quantities of fissionable material. A fissionable material free alumina shell is added to the particles. The shell is also impregnated with platinum or nickel. Temperatures for this conversion are in the range of 0 to 800° F., pressures in the range of 50 to 500 p.s.i.g. and space velocities in the range of 0.05 to 30 volumes of liquid feed measured at 60° F. per volume of contact material per hour. Hydrogen or hydrogen-containing gases are added with the hydrocarbon feed.

(F) Dehydrogenation of hydrocarbons, for example, the dehydrogenation of butane to butylenes, of naphthenes to aromatics or of paraffinic hydrocarbons in the gasoline boiling range to olefinic hydrocarbons over platinum or chromia on alumina containing halogen and containing suitable quantities of fissionable material or over platinum or chromia on silica alumina (an alumina shell which is free of fissionable material is provided) at temperatures in the range of 0 to 800° F., pressures in the range of 0 to 500 p.s.i.g. and space velocities in the range of 0.1 to 30 volumes of liquid feed (measured at 60° F.) per volume of contact material per hour. Hydrocarbon gases may be added with the hydrocarbon feed.

(G) Aromatization of paraffinic hydrocarbons over such contact materials as platinum on charcoal or platinum on alumina containing halogen and containing suitable quantities of fissionable material in the presence of hydrogen and at temperatures in the range of 400 to 1,000° F., pressures in the range of atmospheric to 1,000 p.s.i.g. and space velocities in the range of 0.05 to 40. (Fissionable material is excluded from a 100 micron thick shell portion of the contact material bodies).

(H) Dealkylation or demethylation of alkyl aromatic hydrocarbons, for example, demethylation of toluene to form benzene over microporous silica alumina contact material or alumina impregnated with chromia and containing suitable quantities of fissionable material in the presence or absence of added free hydrogen and at temperatures in the range of 300 to 1,000° F., pressures in the range of atmospheric to 1,000 p.s.i.g. and space velocities in the range of 0.05 to 40. A fissionable-material-free porous alumina shell is provided on the contact material particles.

(I) Alkylation of hydrocarbons, for example, the alkylation of aromatic compounds such as benzene, naphthalene, anthracene, phenols and chloroalkyl or nitro aromatics by contact with alcohols, olefins and alkyl chlorides. Such conversions may be effected in the presence of alumina, pumice or kieselguhr impregnated with aluminum chloride and fissionable material at temperatures in the range of 70 to 350° F. and moderate pressures. Another example is alkylation of isobutane-butylene mixtures over microporous alumina impregnated with aluminum chloride and fissionable material at temperatures in the range of −50 to 1,000° F. and at moderate pressures. Fissionable material is excluded from a 100 micron thick shell portion of the contact material particles.

(J) Hydrocracking of petroleum hydrocarbons, particularly those boiling above gasoline. Such reactions are conducted in the presence of a microporous material such as alumina impregnated with platinum and containing halogen (contact material bodies have 75 micron thick porous alumina shell, free of fissionable material) and in the presence of added hydrogen at temperatures in the range of 400 to 1,000° F. and pressures in the range of 50 to 1,500 p.s.i.g. and space velocities in the range of 0.05 to 40.

(K) Non-hydrogenative cracking of petroleum hydrocarbons, particularly those boiling above gasoline, over alumina or silica-alumina microporous materials impregnated with fissionable materials. Fissionable material is excluded from a shell portion of the contact material bodies. Conversion conditions are temperatures in the range of 400 to 1,200° F., pressures in the range of atmospheric to 500 p.s.i.g. and space velocities in the range of 0.05 to 40. For example, a petroleum gas oil fraction boiling within the range about 400–900° F. or a pure hydrocarbon such as normal-decane may be contacted at 400–600° F., 1–3 atmospheres pressure and 0.5–10 space velocity (liquid volumes at 60° F. per volume of contact material per hour) with a bed of microporous silica-alumina catalyst containing about 4–20% uranium oxide which has been about 30–60% enriched in $U^{235}$. The confined bed which may be similar to that shown in FIGURE 1 may be placed in the blanket area of a nuclear reactor where the neutron flux will be about $5 \times 10^{11}$ neutrons per second per square centimeter. The hydrocarbon material is cracked to lower molecular weight material. The silica-alumina carrier may be in the form of particles having nominal diameters within the range about 500 to 5000 microns and a fissionable material free shell portion about 75–200 microns thick, a loose bulk density of about 45 pounds per cubic foot, pore volume 35–50%, average pore diameter in the range 60 to 100 microns, and surface area in the range 200 to 300 square meters per gram.

(L) Isomerization of paraffins and cycloparaffins over alumina or silica-alumina containing finely dispersed fissionable material at temperatures in the range of 200 to 1,000° F., pressures in the range of atmospheric to 1,000 p.s.i.g. and space velocities in the range of 0.5 to 40. The contact material particles are provided with a fissionable-material-free shell of alumina or silica.

(M) Partial oxidation reactions, for example, conversion of propane with controlled amounts of air or oxygen to alcohols, aldehydes, ketones and acids over microporous active charcoal which has been impregnated with copper oxide and tungsten oxide mixtures and with fissionable materials at temperatures in the range of 50 to 800° F. and pressures in the range of 1 to 100 atmospheres. Another example is the conversion of liquid or gaseous hydrocarbons such as propane in the presence of water to synthesis gas (carbon monoxide and hydrogen) over such microporous contact materials as alumina or graphite impregnated with nickel and with fissionable material. Such conversions are conducted at temperatures in the range of 200 to 1000° F. and pressures in the range of 5 to 1000 p.s.i.g., with residence times in the contact mass in the range of 0.1 to 60 seconds. Fissionable material is excluded from outer 50–100 microns thick shell portion of contact material bodies used in the above examples.

(N) Dehydration reactions such as the dehydration of ethyl alcohol over microporous alumina containing the uranium or other fissionable material at temperatures in the range of 200 to 600° F. and moderate pressures, with resultant formation of ethylene. The contact material bodies are provided with a fissionable-material-free porous alumina shell.

Further example

In further illustration and example of the application of the method of this invention, reference may be made to the conversion of a hydrocarbon gas fraction consisting of a mixture containing 50% by volume methane, 20% ethane, 20% normal propane and 10% normal butane to hydrogen and generally lower molecular weight hydrocarbons. A reactor vessel having a cylindrical bed 30 centimeters in diameter and 270 centimeters long is employed. The bed contains about 141,600 cubic centimeters of spherical pellets of microporous silica-alumina gel particles containing uranium oxide in their core portion and about 28,000 cubic centimeters of spherical graphite pellets of approximately the same size as the silica-alumina particles and uniformly mixed therewith. The contact material particles are prepared from solutions of sodium silicate and aluminum sulfate by the method described in U.S. Patent No. 2,384,946. Uranyl nitrate solution (highly enriched in $U^{235}$) is added along with the aluminum sulfate solution so that the final bead, after drying, contains a uniform dispersion of fissionable material. The beads are soaked in molten wax and, thereafter, a portion of the wax is removed from the pores near the surface in a procedure analogous to the one described in U.S. Patent No. 2,856,367. The particles are then treated with dilute nitric acid solution to remove fissionable material from the portion of the particles nearest the surface thereof. After washing, drying and calcining, the particles contain in their inner portion uranium oxide in which the uranium amounts to about 10% by weight of the total particles, the uranium being about 50% enriched in $U^{235}$. The total amount of $U^{235}$ in the bed is slightly more than 6000 grams. The contact material particles have an average nominal diameter of about 3 millimeters, with a shell thickness of about 100 microns, the outer shell being free of fissionable material. The apparent density of the contact material (unpacked) is about 50 pounds per cubic foot. The surface area of the contact material is about 200 square meters per gram, and the pore volume is about 40% of the total particle volume. The average pore diameter is about 70 angstroms. The reactant feed stream is preheated to 300° F. and passed through the contact mass at a rate of about 1152 grams of feed per minute. The pressure in the conversion zone is maintained at about 5 p.s.i.g. The mass 204 in the reactor 200 contains sufficient $U^{235}$ under all environment and converison conditions in the reactor so that a self sustaining neutrons multiplying fissions reaction occurs. The neutrons, resulting from the fissions are suitably moderated by means of the graphite spheres, the silica-alumina contact material and the chemical reactant material in the zone. The neutron flux is regulated or controlled by regulation of the cadmium-containing control rods, which are so arranged that they can be adjustably inserted into or withdrawn from the bed. The neutrons flux is controlled to promote sufficient fissions to provide the energy required for effecting the chemical conversion. The intensity of the flux in the mass is about $1 \times 10^{13}$ neutrons per square centimeter per second. Excess energy released from the fission reaction above that converted to chemical energy is removed thermal energy from the reactor in part by circulation of a heat exchange fluid through the jacket 24 and in part by the conversion product stream, unconverted hydrocarbons being recovered in part from the products and recycled to the reactor. Thus the inlet temperature of the reactant feed and the circulation of the heat exchange fluid are adjusted to maintain the mass 204 at about 300° F. The products from the conversion will contain hydrogen, $C_2$–$C_6$ hydrocarbons, unconverted feed hydrocarbons and some heavier hydrocarbons.

If desired, the reactor in the above example can be operated as a subcritical reactor by insertion of sufficient control rods to maintain the mass in the subcritical regions and adding neutrons to the mass from an outside source at a rate controlled to provide sufficient fission to effect the chemical conversion. In this case the neutron flux in the reactor may be maintained at about $5 \times 10^{11}$ neutrons per square centimeter per second and the number of control rods in the mass is regulated to maintain the ratio of neutrons in the daughter generation to the number of neutrons existing in the parent generation at a selected value above 0.95 and below 1.0.

General operating conditions

Operating conditions employed in the conversion zone in the method of this invention may vary over a broad range, depending upon the particular chemical conversion involved. In general, temperatures within the contact mass should be sufficiently high for progress of the chemical conversion at a practical rate and yet below a level which would cause serious heat damage to the porous contact material as a result of sintering, change in crystalline structure of one or more of its components or other reasons. The required conversion temperature and other conditions affecting reaction severity will be more moderate than is the case in the absence of the fission product radiation. Generally, the selected contact mass temperature will fall within the range of about −50 to 1,200° F., pressure within the range of subatmospheric to about 100 atmospheres and reactant residence time in the contact mass from about ½ second to about 50 hours, and preferably 1 second to 4 hours. The thermal neutron flux in the contact mass will fall within the range of about $10^{11}$ to $10^{14}$ per square centimeter per second.

It should be understood that the specific examples of operating conditions and methods, apparatus arrangement and applications of the invention described herein are exemplary in character and are not to be construed as limiting the scope of the invention thereto unless so stated.

I claim:

1. A method for utilizing the energy of the fission fragments from nuclear fission of fissionable material for the conduct of chemical conversions of fluid reactants to fluid products of different composition, which conversions require supply of substantial amounts of energy, which method comprises: contacting fluid reactant feed material in a confined zone with a mass of contact material made up of at least one body comprised of an inner portion containing fissionable material and a porous outer shell portion which is substantially free of fissionable material, said shell portion being of sufficient thickness to substantially prevent initial escape of normally solid fragments of fission therethrough to the exterior surface thereof and having porosity characteristics adapted to permit escape of gaseous fission products and to permit ingress and egress of fluid reactant, maintaining a neutron flux in said contact material suitably controlled to cause fission of said fissionable material at a rate sufficient to supply the energy required for effecting the chemical conversion of said fluid reactant feed to desired products and separating fluid products of said conversion from said contact material.

2. The method of claim 1 further characterized in that the outer shell portion of said body is microporous solid material having a surface area within the range of about 5 to 1,500 square meters per gram and having at least 5% of its volume devoted to pores, greater than 50% of the total pores having average radii less than 100 angstroms, and inner portion of said body containing an amount of fissionable material sufficient to render said mass in said zone under conversion conditions therein capable of effecting a neutron-multiplying nuclear fission reaction when a suitably controlled neutron flux is maintained in said mass.

3. A method for utilizing the energy of the fission fragments from nuclear fission of fissionable material for the conduct of chemical conversions of fluid reactants to fluid products of different composition, which conversions require supply of substantial amounts of energy, which method comprises: contacting fluid reactant feed material in a confined zone with a mass of porous contact material made up of at least one body comprised of an inner microporous carrier portion containing fissionable material dispersed in less than about 6 micron grain size and a porous outer shell portion having about 5% to 70% of its volume devoted to pores of average radius within the range of about 4 angstroms to about 100 microns, said shell portion being substantially free of fissionable material and having a thickness sufficient to prevent substantial initial escape of normally solid fragments of fission therethrough to the exterior surface thereof and within range of about 10 to 100 microns, the concentration of fissionable material in said inner carrier portion being sufficient to render said mass in its environment in said conversion zone under the conditions of said chemical conversion, including suitable neutron moderation and in the presence of suitable neutron flux, capable of effecting a neutron-multiplying fission reaction, maintaining a neutron flux in said mass and moderating the neutrons in said mass, whereby neutron-multiplying fission of said fissionable material occurs with resultant release of heavy fission fragments within said mass, whereby chemical conversion of said fluid reactant feed is effected with concurrent transformation of some of the kinetic energy in the heavy fragments from the said fission reaction to chemical energy, controlling the neutron flux in said mass and the amount of fission to supply the energy required for effecting the desired chemical conversion, maintaining said mass at a suitable temperature level for said chemical conversion and below a temperature which would cause rapid heat damage to said body, and separating the fluid products of said chemical conversion from said mass while retaining the normally solid fragment products from the fission reaction within said mass.

4. A method according to claim 3 further characterized in that said fissionable material is at least one of the isotopes selected from the group consisting of uranium-235, uranium-233 and plutonium-239.

5. A method for utilizing the energy of the fission fragments from nuclear fission of fissionable material for the conduct of chemical conversions of fluid reactants to fluid products of different composition, which conversions require supply of substantial amounts of energy, which method comprises: contacting the fluid reactant feed material in a confined zone with a mass of contact material made up of discrete solid particles, each particle comprising an inner core containing fissionable material encased in a shell of porous solid material substantially free of fissionable material, which shell is of sufficient thickness to prevent substantial initial escape of normally solid products of fission therethrough to the exterior surface thereof, said shell having porosity characteristics adapted to permit escape of gaseous fission products and to permit ingress and egress of the fluid reactant, maintaining an neutron flux in said mass suitably controlled to cause fission of said fissionable material at a rate sufficient to supply the energy required to effect the chemical conversion of said fluid reactants to desired products and separating fluid products of said conversion from said contact material.

6. The method of claim 5 further characterized in that said inner core of each contact material particle is a microporous carrier material, having a surface area within the range of 5 to 1,500 square meters per gram, containing fissionable material dispersed in less than 6 micron grain size, and said shell has a thickness within the range of about 10 to 100 microns and a pore volume, greater than 50% of the total pores in said shell having an average radius greater than 100 angstroms.

7. The method of claim 5 further characterized in that the nominal diameters of said particles of contact material are within the range of 100 microns to 1 inch and said shell is a microporous solid material having a surface area within the range of 5 to 1,500 square meters per gram and having at least 5% of the volume thereof devoted to pores, at least 25% of the total pores having an average radius less than 100 angstroms, and the thickness of said shell being within the range of 10 to 100 microns.

8. The method of claim 5 wherein said discrete solid particles have nominal diameters within the range of about 100 microns to about 1 inch.

9. A method for utilizing the energy of the fission fragments from nuclear fission of fissionable material for the conduct of chemical conversions of fluid reactants to fluid products of different composition, which conversions require supply of substantial amounts of energy, which method comprises: contacting fluid reactant feed material in a confined zone with a mass of contact material made up of discrete solid particles having nominal diameters within the range of about 100 microns to about 1 inch, each particle comprising a microporous inner portion having a surface area within the range of about 5 to 1,500 square meters per gram and containing fissionable material dispersed in grain size less than about 6 microns and a porous outer portion substantially free of fissionable material, which outer portion has a thickness in excess of about 10 microns and is adapted to prevent substantial initial escape therethrough to the exterior surface thereof of normally solid fragments released by fission of the material in said inner portion, said outer portion having porosity characteristics adapted to permit escape therefrom of gaseous products from said fission and to permit ingress thereinto of said fluid reactant feed, said fissionable material being present in said particles in sufficient concentration to render said mass in its environment in said zone under the chemical conversion conditions, including suitable neutron moderation, and in the presence of suitable neutron flux, capable of effecting a neutron-multiplying fission reaction, maintaining a neutron flux in said mass and moderating the neutrons in said mass, whereby neutron-multiplying fission of said fissionable material occurs, with resultant release of heavy fission fragments of high kinetic energy within said particles, whereby chemical conversion of said reactant feed is effected with concurrent transformation of some of the kinetic energy of said heavy fragments to chemical energy, controlling said neutron flux to promote at least sufficient fission reaction to supply the energy required for effecting the desired chemical conversion of said fluid reactant feed to the desired products, controlling the temperature in said zone at a level suitable for said chemical conversion and below a level at which the contact material would suffer excessive heat damage, and separating fluid conversion products from said mass.

10. A method according to claim 9 further characterized in that said particles of contact material contain substantial amounts of effective solid moderator material having a thermal neutron capture cross-section below about 0.2 barn.

11. The method of claim 9 further characterized in that said contact material particles are of substantially spherical shape, and said outer shell portion has a thickness within the range of about 20 to 50 microns, a pore volume within the range of 5% to 70% and greater than 50% of the pores in said shell portion have average radii greater than about 100 angstroms.

12. The method of claim 9 further characterized in that the inner portion and outer shell portion of said particles of contact material are composed of essentially the same microporous solid material except that fissionable material is present only in the inner portion, and said shell portion having a thickness within the range of about 20 to 50 microns.

13. A method for utilizing the energy of the fission fragments from nuclear fission of fissionable material for the conduct of chemical conversions of fluid reactants to fluid products of different composition, which conversion requires supply of substantial amounts of energy, which method comprises: maintaining in a confined conversion zone a mass of particle-form contact material made up of particles having nominal diameters within the range of about $\frac{1}{10}$ to $\frac{1}{4}$ inch, each particle being comprised of an inner portion containing fissionable material and a porous outer portion which is substantially free of fissionable material and which has a surface area within the range of 5 to 1,500 square meters per gram and a pore volume within the range of 5% to 70% and a thickness within the range of about 10 to 100 microns, the thickness of said outer portion being sufficient to prevent substantial initial escape from the exterior surface of said particles of normally solid fission fragments emanating from fission of the fissionable material in said inner portions of said particles, the amount of fissionable material in said inner portions of said particles being sufficient in the environment in saio zone to provide a self-sustaining, neutron-multiplying fission reaction of critical intensity, passing fluid reactant feed through said confined zone into contact with said contact material while said nuclear fission reaction is in progress, whereby a portion of the energy released by fission is made available for effecting conversion of said fluid reactant feed to a fluid reactant product of different composition, withdrawing the fluid reactant product from said confined zone, regulating the content of neutron-moderating and absorbing material in said fluid reactant feed and its rate of passage through said confined zone to maintain said neutron-multiplying nuclear fission reaction at least critical and further suitably controlling the neutron flux in said contact material to promote said fission of said fissionable material at a rate sufficient to supply the energy required for effecting said chemical conversion of said fluid reactant feed, and controlling the temperature within said mass at a level suitable for the desired chemical conversion of said fluid reactant at least in part by removing excess fission energy from said mass in the form of thermal energy.

14. A method for utilizing the energy of the fission fragments from nuclear fission of fissionable material for the conduct of chemical conversions of fluid reactants to fluid products of different composition, which conversions require supply of substantial amounts of energy, which method comprises: contacting fluid reactant feed material in a confined zone with a mass of contact material made up of at least one body comprised of a suitably supported layer of solid, microporous carrier material containing fissionable material dispersed in grain size less than about 6 microns and of a shell layer of solid, porous material covering the exposed surface of said first-named layer, said shell layer being substantially free of fissionable material and having a thickness of at least about 10 microns which is sufficient to prevent substantial initial passage therethrough to the exterior surface thereof of normally solid fission fragments released during fission of said fissionable material in said first-named layer, maintaining a neutron flux in said contact material suitably controlled to cause fission of said fissionable material at a rate sufficient to supply the energy required for effecting the chemical conversion of said fluid reactant feed to desired products and separating fluid products of said conversion from said contact material.

15. A contact material for carrying out chemical reactions comprising discrete microporous solid particles having nominal diameters within the range of about 100 microns to about 1 inch, each particle comprising a microporous inner portion surrounded by a microporous outer portion, the micropores in said particles admitting fluid chemical reactants thereto; said inner portion comprising a mixture of carrier material and fissionable material and serving as a fission products-forming area in which high energy normally solid fission products are formed and energy therefrom is transferred to said reactants, said fissionable material having a grain size of less than about 6 microns; said outer portion comprising carrier material which is substantially free of fissionable material and acting to substantially retain said normally solid fission products within said particle, said outer portion having a thickness in the range of 10 to 100 microns; and said contact material being characterized by having a surface area of 5 to 1,500 square meters per gram and a pore volume of 5 to 70% of which more than 50% of said pores having radii greater than about 100 angstroms.

References Cited by the Examiner
UNITED STATES PATENTS

| 2,872,396 | 2/1959 | Wilson et al. | |
| 2,905,610 | 9/1959 | Wigner | 176—39 X |
| 2,928,780 | 3/1960 | Harteck et al. | 176—10 |
| 2,958,637 | 11/1960 | Voorhees | 176—39 |
| 3,065,159 | 11/1962 | Connor et al. | 176—14 |
| 3,085,057 | 4/1963 | Ogorzaly | 176—39 |

FOREIGN PATENTS

| 216,006 | 7/1958 | Australia. |
| 583,465 | 9/1959 | Canada. |
| 821,297 | 10/1959 | Great Britain. |

OTHER REFERENCES

Proceedings of the Second International Conference on the Peaceful Uses of Atomic Energy, paper 76, vol. 8, pp. 253–262.

REUBEN EPSTEIN, *Primary Examiner.*

ROGER L. CAMPBELL, LEON D. ROSDOL, CARL D. QUARFORTH, *Examiners.*

R. L. GOLDBERG, *Assistant Examiner.*